(12) United States Patent
Kondo et al.

(10) Patent No.: US 7,389,998 B2
(45) Date of Patent: Jun. 24, 2008

(54) VEHICLE STEERING SYSTEM

(75) Inventors: Kazuo Kondo, Sagamihara (JP);
Yoshihiro Kawabe, Kamakura (JP);
Michihito Hirahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 411 days.

(21) Appl. No.: 10/888,596

(22) Filed: Jul. 12, 2004

(65) Prior Publication Data

US 2005/0017472 A1    Jan. 27, 2005

(30) Foreign Application Priority Data

Jul. 23, 2003   (JP)   ............... 2003-200438
Jun. 1, 2004    (JP)   ............... 2004-163338

(51) Int. Cl.
*B60G 7/00* (2006.01)

(52) U.S. Cl. .................. 280/93.502; 280/5.52

(58) Field of Classification Search ............ 280/93.502, 280/93.508, 93.509, 93.512, 124.125, 124.134, 280/124.135, 124.138, 124.15, 5.51, 5.52
See application file for complete search history.

(56) References Cited

U.S. PATENT DOCUMENTS

| 2,177,934 | A | * | 10/1939 | Britton et al. | ......... 280/124.136 |
| 3,027,963 | A | * | 4/1962 | Nicholson | .................. 180/424 |
| 3,587,767 | A | * | 6/1971 | Gamaunt | ................... 180/431 |
| 4,440,420 | A | | 4/1984 | Muller | |
| 4,878,688 | A | | 11/1989 | Kubo | |
| 4,941,677 | A | * | 7/1990 | Matsumoto et al. | ... 280/124.138 |
| 5,388,855 | A | * | 2/1995 | Yamamoto et al. | .... 280/124.138 |
| 5,482,125 | A | * | 1/1996 | Pagett | ....................... 180/6.32 |
| 5,498,018 | A | * | 3/1996 | Wahl et al. | ............ 280/124.146 |
| 6,325,396 | B1 | * | 12/2001 | Romig | ......................... 280/98 |
| 2003/0155735 | A1 | * | 8/2003 | Takahashi et al. | ........ 280/93.51 |

FOREIGN PATENT DOCUMENTS

| DE | 868 117 C | 2/1953 |
| DE | 27 31 590 A1 | 1/1979 |
| DE | 198 40 135 A1 | 3/2000 |
| EP | 1 213 206 A2 | 6/2002 |
| JP | 6-219314 A | 8/1994 |

* cited by examiner

*Primary Examiner*—Ruth Ilan
*Assistant Examiner*—Leonard McCreary, Jr.
(74) *Attorney, Agent, or Firm*—Global IP Counselors, LLP

(57) ABSTRACT

A vehicle steering system is configured to avoid contact between wheels and wheel housings when the wheels are steered and to enlarge the maximum steering angle. The vehicle steering system has a steering knuckle that supports a wheel for rotation about a wheel axis and a pivotal movement about a steering axis. The steering knuckle is coupled to a first end part of an extension link. A second end part of the extension link is connected to an arm through a control rod. The extension link is pivotally sustained around a steering axis. The arm is connected to a front end of a knuckle arm through a tie rod. When the arm turns, the second end part of the extension link is pulled inside through the control rod, and the steering knuckle situated on rear end of the control rod is pushed outwardly. At the same time, the arm steers the steering knuckle through the tie rod.

19 Claims, 21 Drawing Sheets

VEHICLE STEERING SYSTEM

BACKGROUND OF THE INVENTION

1. Field of the Invention

The present invention generally relates to a vehicle steering system for steering wheels of a vehicle. More specifically, the present invention relates to a steering system that provides for widening the maximum steering angle without enlarging the wheel housings of the vehicle.

2. Background Information

Generally, there are two basic types of steering systems used on passenger cars: manual and power. In a manual steering system, the driver's effort to turn the steering wheel is the primary force that causes the front steerable wheels to turn to the left or right on steering knuckles. With power steering, the driver's turning efforts are multiplied by a hydraulic or in electro hydraulic assist. Whether the steering system is a manual steering system or a power steering system, one of the most common types of steering system is a rack-and-pinion type steering system. A typical rack-and-pinion steering system basically includes a pinion shaft, a rack gear, a gear housing, two tie rod assemblies and two steering knuckles.

When a wheel turns around a kingpin or steering axis, generally one part of the wheel shifts its position inward in the widthwise direction of a vehicle. In the meantime, the other part of the wheel shifts outward of the vehicle. Therefore, if the steering angle becomes larger, the wheel contacts the wheel housing.

The wheel housing can be widened in the widthwise direction in order to avoid the contact and therefore the maximum steering angle can be larger. However, it will be impossible to mount a large engine or a large transmission by sacrificing the space for the wheel housing. On example of a vehicle steering system that attempts to widen the maximum angle of the steerable wheels without enlarging wheel housings is disclosed in Japanese Laid-Open Publication No. 6-219314. The vehicle steering system disclosed in this Japanese publication is designed to widen the maximum steering angle of the steerable wheel disposed on the outside of the vehicle's turn radius, even when the steerable wheel disposed on the inside of the vehicle's turn radius reaches its maximum angle, by installing an expansion and contraction mechanism in each of the links that are attached to the knuckle arms.

In view of the above, it will be apparent to those skilled in the art from this disclosure that there exists a need for an improved vehicle steering system. This invention addresses this need in the art as well as other needs, which will become apparent to those skilled in the art from this disclosure.

SUMMARY OF THE INVENTION

It has been discovered that the steering system disclosed in the Japanese publication, mentioned above, cannot widen the maximum steering angle of the steerable wheel located inside of vehicle's radius of turn. Thus, this steering system does not fundamentally solve the problem of the restriction in the maximum steering angle due to the wheel housings.

One object of the present invention is to provide a vehicle steering system that enlarges the maximum steering angle of the vehicle without enlarging the wheel housings in a lateral widthwise direction of the vehicle and without sacrificing space in an engine room.

In view of the foregoing object, a vehicle steering system of the present invention is provided that basically comprises a vehicle wheel and a steering assembly. The vehicle wheel is configured to be disposed on a side of a vehicle.

The steering assembly rotatably supports the vehicle wheel about a wheel rotational axis and pivotally supports the vehicle wheel about a steering axis such that the steering axis moves in a widthwise direction of the vehicle in response to steering of the vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
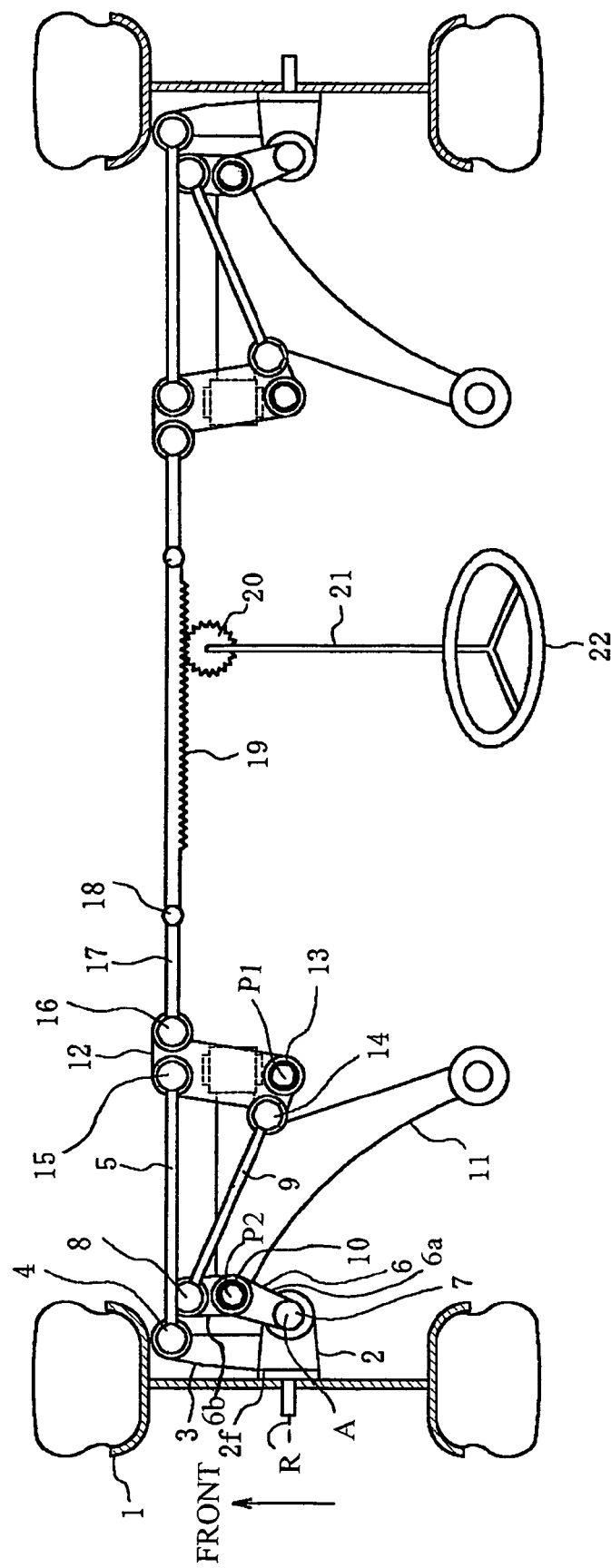
FIG. 1 is a partial diagrammatic top plan view of a vehicle steering system in accordance with a first embodiment of the present invention.

Referring initially to FIG. 1, a vehicle steering system is illustrated in accordance with a first embodiment of the present invention. The steering system of the present invention avoids contact between a pair of steerable wheels 1 and the wheel housings of the vehicle body because when the wheels 1 turn about their kingpin axes A of a pair of steering knuckles 2 shift outwardly in the widthwise direction of the vehicle. As a result, the steering system widens the maximum steering angle. In particular, FIG. 1 illustrates a rack-and-pinion type steering system that is used in conjunction with a strut type suspension in accordance with the first embodiment of the present invention.

The vehicle steering system of the first embodiment of the present invention as well as all of the other embodiments of the present invention are designed to shift the steering knuckles 2 outwardly away from the wheel housings of the vehicle body to increase the maximum turning angle. In particular, the kingpin axes A and the steering knuckles 2 shift outwardly in the vehicle's widthwise direction so that the steerable wheels 1 shifts away from the vehicle, when the drive steers the vehicle to make a turn. Therefore, even when the driver steers large and either front or rear end of the wheel shifts inwardly, the wheel does not contact the wheel housing.

Basically, the rack-and-pinion type steering system swivels the steerable wheels 1 back and forth in response to the driver's input. The rack-and-pinion type steering system (only left side numbered) includes the two steering knuckles 2 with steering knuckle arms 3 pivotally connected by ball joints or connecting points 4 to outer tie rods 5, and two extension links 6 pivotally connected at their rear end parts 6a to the steering knuckles 2. The front end parts 6b of the extension links 6 are pivotally connected a pair of control rods 9, respectively. Each of the extension links 6 is pivotally mounted by a ball joint 10 to a lower link 11 of the strut type suspension. The rack-and-pinion type steering system further includes a pair of arm members 12 that are pivotally mounted on fixed vehicle side members of the vehicle that are not shown in the drawings. In particular, each of the arm members 12 has a rear end part with a pivotal attachment point P1 through a pin joint or connecting point 13 that has a center pivot axis extending substantially in a vertical direction. As explained below, the pivotal movement of the arm members 12 moves the control rods 9, which in turn pivot the extension links 6 about a pivot axis P2.

The steering knuckles 2 support the steering wheels 1 at the lateral sides of the vehicle for rotation about the wheel rotational axes R and for swiveling movement about the kingpin or steering axes A. Each steering knuckle 2 comprises a knuckle arm 3 that extends in a forward longitudinal direction of the vehicle from a front end part 2f of the steering knuckle 2. The front end of the knuckle arm 3 is pivotally coupled to the tie rod 5 through the pin or ball joint 4 that has a center pivot axis extending substantially in a vertical direction.

Figure 2:
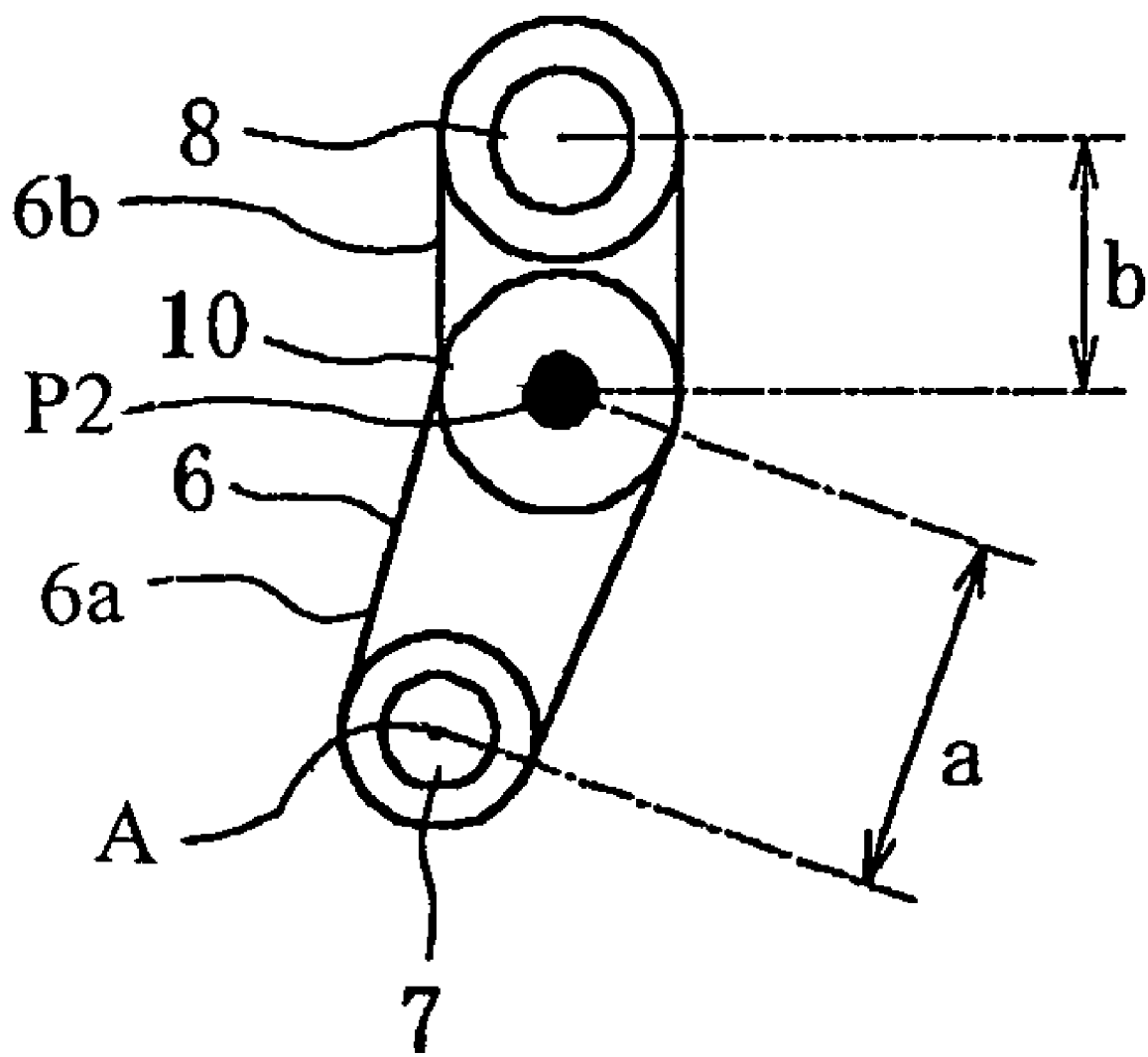
FIG. 2 is an enlarged diagrammatic top plan view of the extension link of the vehicle steering system illustrated in FIG. 1 according to the first embodiment.

The rear end part 6a of the extension link 6 extends rearwardly from the steering axis A, and is situated closer to the center of the vehicle than the steering knuckle 2. The steering knuckle 2 is pivotally coupled to the rear end part 6a of the extension link 6 by a pin joint 7 that forms the kingpin or steering axis A which extends substantially in a vertical direction. In the meantime, the front end part 6b of the extension link 6 is connected to the control rod 9 through a ball joint or connecting point 8. The steering axis A is located between the rear end part 6a and the front end part 6b. Thus, the extension link 6 is situated at one end of a strut type suspension to pivot through the ball joint 10. In addition, the rear end part 6a is situated outside of a line between the front end part 6b and the steering axis A by bending the extension link 6 at the steering axis A to form an elbowed shape member. Also, shown in the horizontal projection of the extension link 6 in FIG. 2, the extension link 6 is configured such that the distance "a" between the steering axis A and the rear end part 6a is longer than the distance "b" between the steering axis A and the front center pivot of the front end part 6b. In other words, the distance "a" between the connecting point 10 of the extension link 6 and the connecting point 7 with the knuckle 2 is larger than the distance "b" between the connecting point 10 and the connecting point 8 with the control rod 9. Therefore, even if the amount of the shift of the joint point 8 toward inside of the vehicle is small, it is possible to push the joint point 7 outward of the vehicle because of high leverage ratio. Thus, even though the steering angle is large and a part of the wheel 1 shifts inside toward the vehicle's center, it is possible to surely avoid the contacts between the wheel 1 and the wheel housing.

The rear part of each arm member 12 has a rear end part with the connecting point 13 forming the pivotal attachment point P1. The rear part of each arm member 12 is connected to the inside end of the control rod 9 through a ball joint forming a rear connecting point or joint 14. Thus, the connecting point 14, which is situated further away from the center of the vehicle than the connecting point 13. In addition, two front connecting points or joints 15 and 16 are situated on a front end part of the arm member 12. The front part of each arm member 12 has the connecting point 15 is disposed further outside than the connecting point 16. The connecting point 15 is pivotally coupled to the inside end in widthwise direction of the tie rod 5 by a pin joint with its axis extending substantially in a vertical direction. On the other hand, the connecting point 16 is pivotally coupled through a ball joint to an outside end of a link rod or connecting member 17 extending generally a widthwise direction of the vehicle's body.

The inside end of the link rod or connecting member 17 is pivotally coupled to the outer end of the steering rack 19 through a ball joint or connecting point 18. On the other hand, the outside end of the link rod 17 is connected to the arm member 12 of the steering system for steering the wheel 1 in response to reciprocal movement of the steering rack 19. The right side of the steering system is a mirror image of the left side of the steering system in FIG. 1.

The steering rack 19 is meshed with a pinion 20 that is connected to one end of the steering shaft 21. When the driver turns a steering wheel 22, the rotary motion of the steering wheel 22 is a converted to a rectilinear motion in the widthwise direction of the vehicle's body. The arm members 12 are connected to the steering rack 19 through the link rods 17 to rotate in a counter-clockwise direction when turning to the left side of the vehicle and to rotate in a clockwise direction when turning to the right side of the vehicle. The steering knuckles 2 are connected to the arm members 12 through the tie rods 5 and the knuckle arms 3 to turn the wheels 1 to the left or right side of the vehicle.

Figure 4:
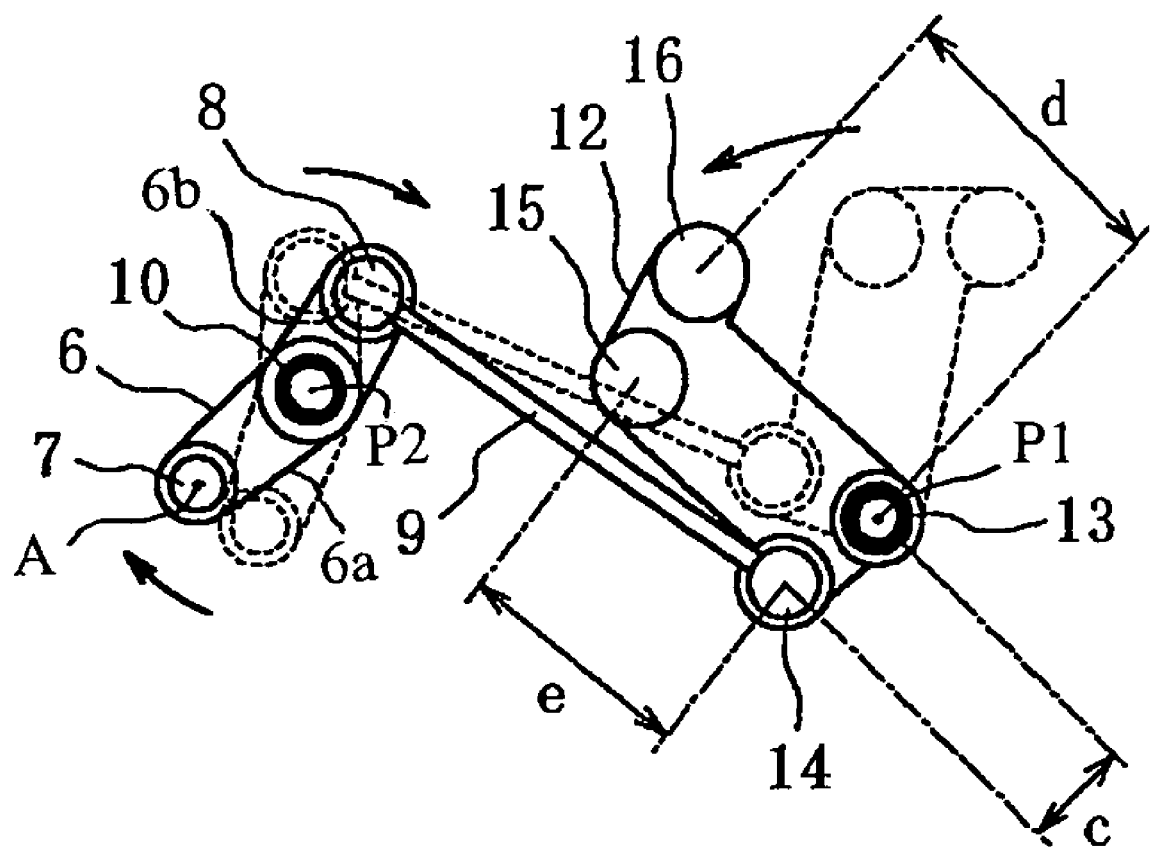
FIG. 4 is a diagrammatic illustration showing the vehicle steering system, shown in FIG. 3, in motion.

As shown in FIG. 4, in order to attain the desired push effect of the wheel 1 by the rear end part 6a of the extension link 6, it is possible to pull the control rod 9 inward with strong force by making the distance "c" smaller between the pivotal attachment point P1 and the connecting point 14 than distance "d" between the pivotal attachment point P1 and the connecting point 16. Also, while attaining the push effect mentioned above, as also shown in FIG. 4, it is desired to make the distance "c" between the pivotal attachment point P1 and the connecting point 15 smaller than the distance "e" between the center of turning and the connecting point 15. Also, the distance "a", distance "b", and the length of the knuckle arm 3 must be made appropriate as mentioned above.

Figure 3:
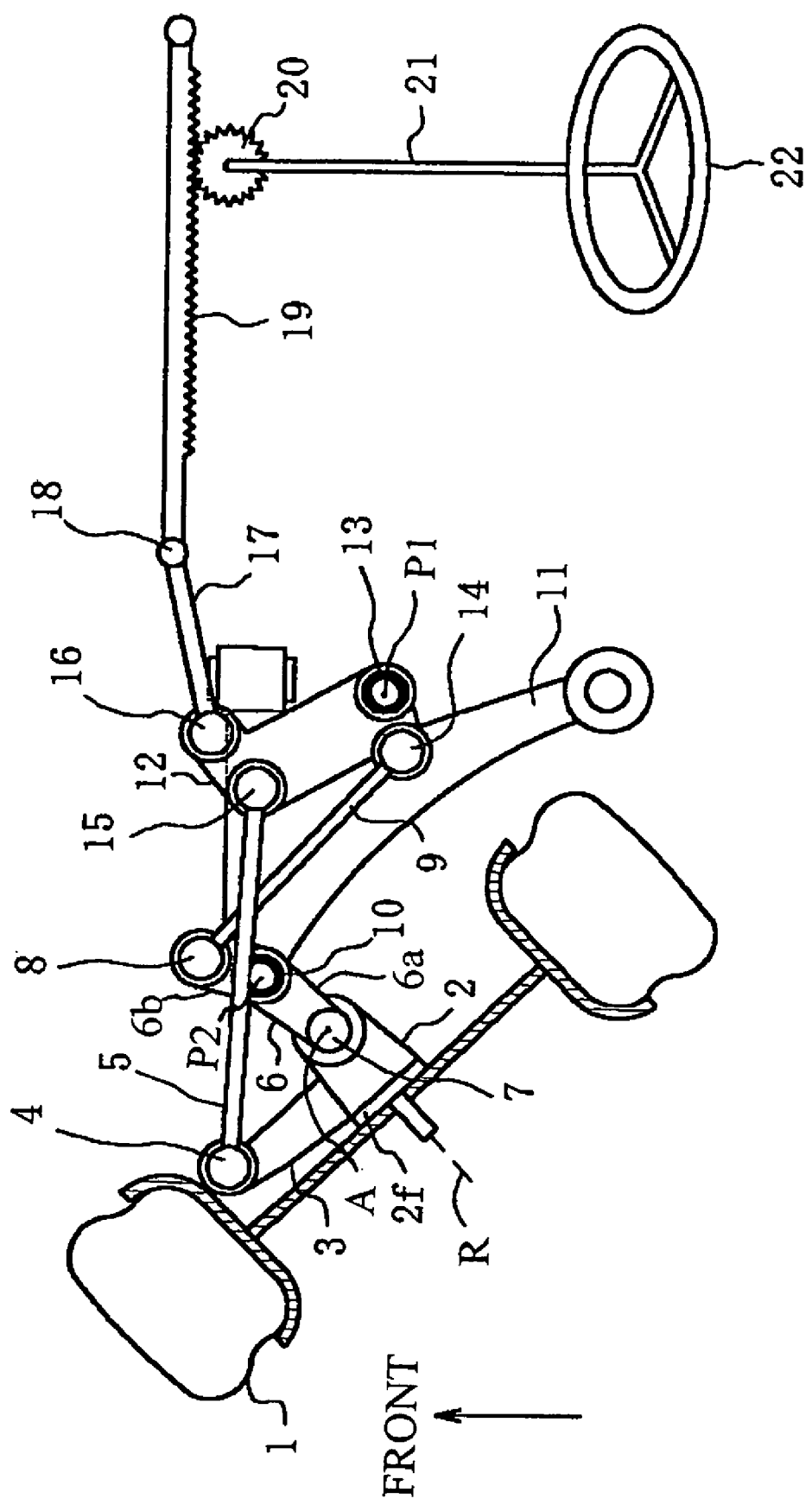
FIG. 3 is a partial diagrammatic top plan view of the vehicle steering system illustrated in FIG. 1 in accordance with the first embodiment with the steering system turned towards the left side of the vehicle.

FIG. 3 is a partial diagrammatic top plan view of the vehicle steering system when the steering wheel 22 has been turned to pivot the wheels 1 to the left side of the vehicle. When the driver turns the steering wheel 22 to the left, the steering rod 19 shifts to the left side of the vehicle in the vehicle's widthwise direction by the effect of the rack-and-pinion type steering system. The arm members 12 are connected to the steering rack 19 through the link rods 17 to rotate in a counter-clockwise direction when turning to the left side of the vehicle. In the case of turning to the left side of the vehicle, the steering knuckles 2 are connected to the arm members 12 through the tie rods 5 and the knuckle arms 3 such that they turn the wheels 1 to the left side of the vehicle. Therefore, the wheels 1 are wholly sustained by the steering knuckles 2 when turning to the left side of the vehicle.

In the case of turning to the left side of the vehicle, the arm members 12 rotate around the center turning axes P1 to pull the front end parts 6b of the extension links 6 through the control rods 9 to the inside direction of vehicle's body. When the front end parts 6b shift inwardly in the vehicle's widthwise direction, the rear end parts 6a with the steering axes A shifts outwardly in vehicle's widthwise direction such that the steering knuckles 2 and the wheels 1 are pushed outwardly in the vehicle's widthwise direction.

As above stated, when the wheels 1 and the steering knuckles 2 are steered to the left, they are displaced or shifted to outside in the vehicle's widthwise direction. FIG. 4 is a partial diagrammatic top plan view that shows the movements of one of the extension links 6, one of the control rods 9 and one of the arm members 12, when the wheels 1 are steered to the left side of the vehicle.

Figure 5:
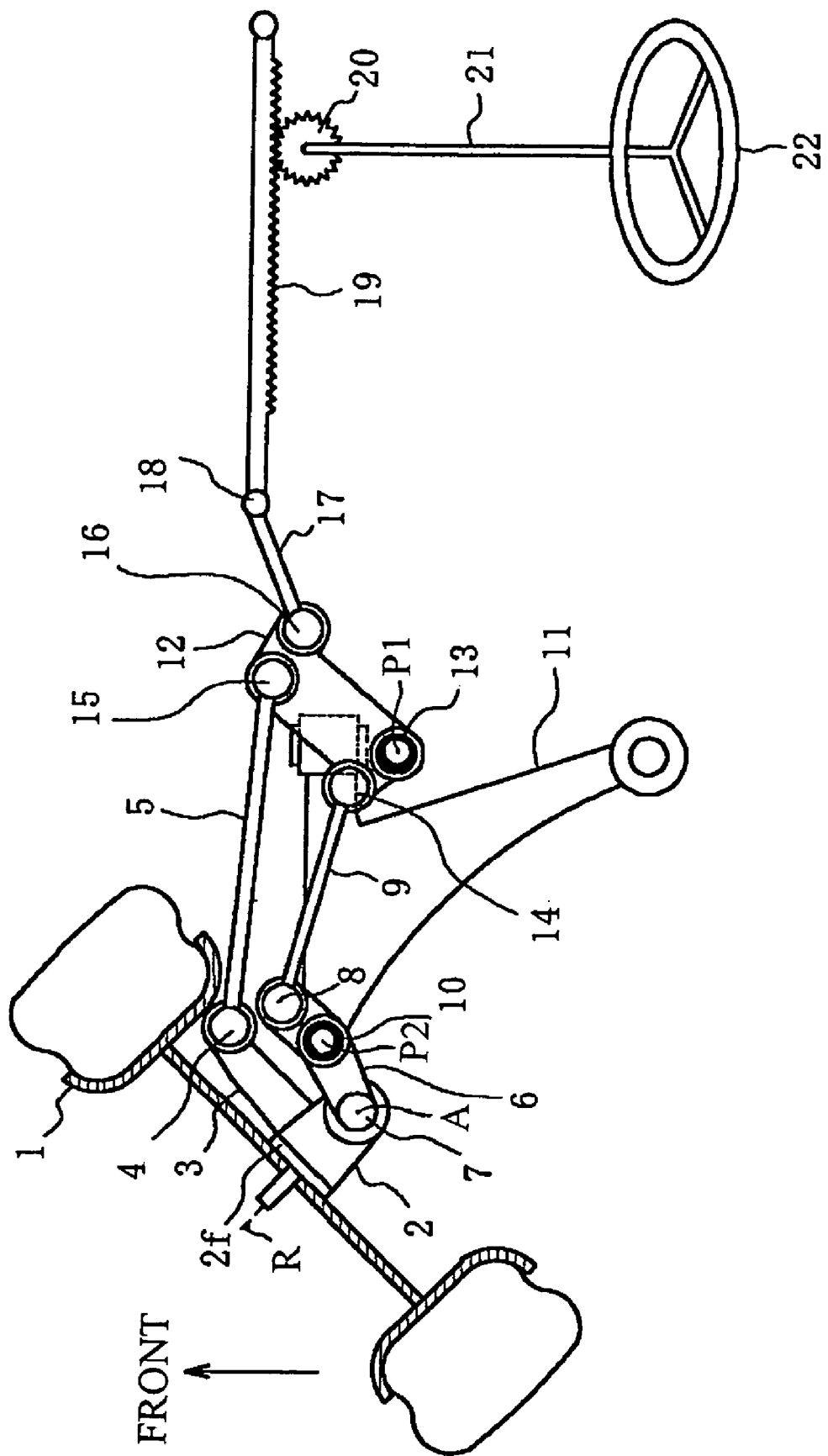
FIG. 5 is a partial diagrammatic top plan view of the vehicle steering system illustrated in FIGS. 1-4 according to the first embodiment with the steering system turned towards the right side of the vehicle.

FIG. 5 is a partial diagrammatic top plan view, which shows a condition when the vehicle steering system turns the wheels 1 to the right side of the vehicle. When the driver turns the steering wheel 22 to the right side of the vehicle, the steering rack 19 shifts to the right in the vehicle's widthwise direction by the effect of a rack-and-pinion type steering system. The arm members 12 are connected to the steering rod 19 through the link rods 17 to rotate in a clockwise direction when the wheels 1 are turned to the right side of the vehicle. In the case of turning to the right side of the vehicle, the steering knuckles 2 are connected to the arm members 12 through the tie rods 5 and the knuckle arms 3 such that the wheels 1 are turn to the right side of the vehicle. Therefore, the wheels 1 are wholly sustained by the steering knuckle 2 when turning to the right side of the vehicle.

In the case of turning to the right side of the vehicle, the arm members 12 rotate around the center turning axes P1 to pull the front end parts 6b of the extension links 6 through the control rods 9 to the inside direction of vehicle's body. When the front end parts 6b shift to the inside in the vehicle's widthwise direction, the rear end parts 6a shift outwardly in vehicle's widthwise direction such that the steering knuckles 2 and the wheels 1 are pushed to the outside in vehicle's widthwise direction.

Figure 6:
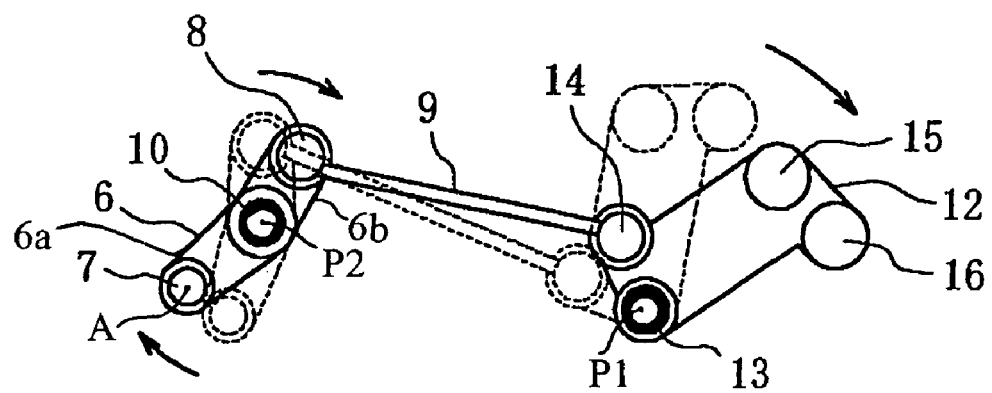
FIG. 6 is a diagrammatic illustration showing the vehicle steering system, shown in FIG. 5, in motion.

As above stated, when the wheels 1 and the steering knuckles 2 are steered to the left side of the vehicle as seen in FIG. 3, the wheels 1 and the steering knuckles 2 are displaced or shifted to outside in the vehicle's widthwise direction. FIG. 4 is a partial diagrammatic top plan view that shows the movements of one of the extension links 6, one of the control rods 9 and one of the arm members 12, when the wheels 1 are steered to the left side of the vehicle. Likewise, when the wheels 1 and the steering knuckles 2 are steered to the right side of the vehicle as seen in FIG. 5, the wheels 1 and the steering knuckles 2 are displaced or shifted to outside in the vehicle's widthwise direction. FIG. 6 is a partial diagrammatic top plan view that shows the movements of one of the extension links 6, one of the control rods 9 and one of the arm members 12, when the wheels 1 are steered to the right side of the vehicle.

When the driver turns the steering wheel 22 back from either the right side or left side of the vehicle to the center position (i.e., so the vehicle travels in a straight line), the wheels 1 turn in a reverse order so as to shift inwardly, and makes the steering angle smaller. When the driver completes the turning of the steering wheel 22 back to the center position, each member of the vehicle steering system of the present invention, including the steering wheel 1, the knuckle 2, the tie rod 5, the control rod 9, and the arm member 12, shifts to a position for going straight as shown in FIG. 1 from the previous position for turning the vehicle as shown in FIGS. 3 to 6.

As shown in this embodiment of the vehicle steering system of the present invention, the wheels 1 are configured in the side of the vehicle is pushed outwardly from the wheel housings of the vehicle body. Therefore, when the driver steers to either left or right side of the vehicle and makes the steering angle larger, it is possible to avoid the contact between wheel 1 and the wheel housing of the vehicle body.

In accordance with this first embodiment of the present invention, on each half of the steering system, the steering knuckle 2, the extension link 6, and the arm member 12 are arranged sequentially in a line from the wheel 1 toward the center of the vehicle. The extension link 6 generally extends in the vehicle's lengthwise direction with the steering knuckle 2 being pivotally coupled at the rear end part 6a. The extension link 6 is joined at the front end part 6b to the arm member 12 through the control rod 9 and the ball joints 8 and 14. The extension link 6 is generally fixed to the lower link 11 of the suspension arm at the pivot axis P2. The arm member 12 is connected to the front end part 6b of the extension link 6 at a joint point situated further outside than the pivotal attachment point P1, while the arm member 12 is connected to the knuckle arm 3 by the tie rod 5 through the connecting points 4 and 15. Therefore, when the arm member 12 turns to the right, the wheels 1 turn to the right. In other words, the wheels 1 are pushed outside in the vehicle's widthwise direction. On the other hand, when the arm members 12 turn to the left, the wheels 1 turn to the left. In other words, the wheels 1 are pushed outside in the vehicle's widthwise direction. As a result, even though the steering angle is large and a part of the each of wheels 1 shifts inside toward the vehicle's center, it is possible to avoid contact between wheels 1 and the wheel housings (not shown) and to make the radius of turn of the vehicle smaller. In other words, it is possible to downsize designed space for the wheel housings without sacrificing space in an engine room. Therefore, even though a vehicle is not wide, a large engine or transmission can be formed.

Second Embodiment

Figure 7:
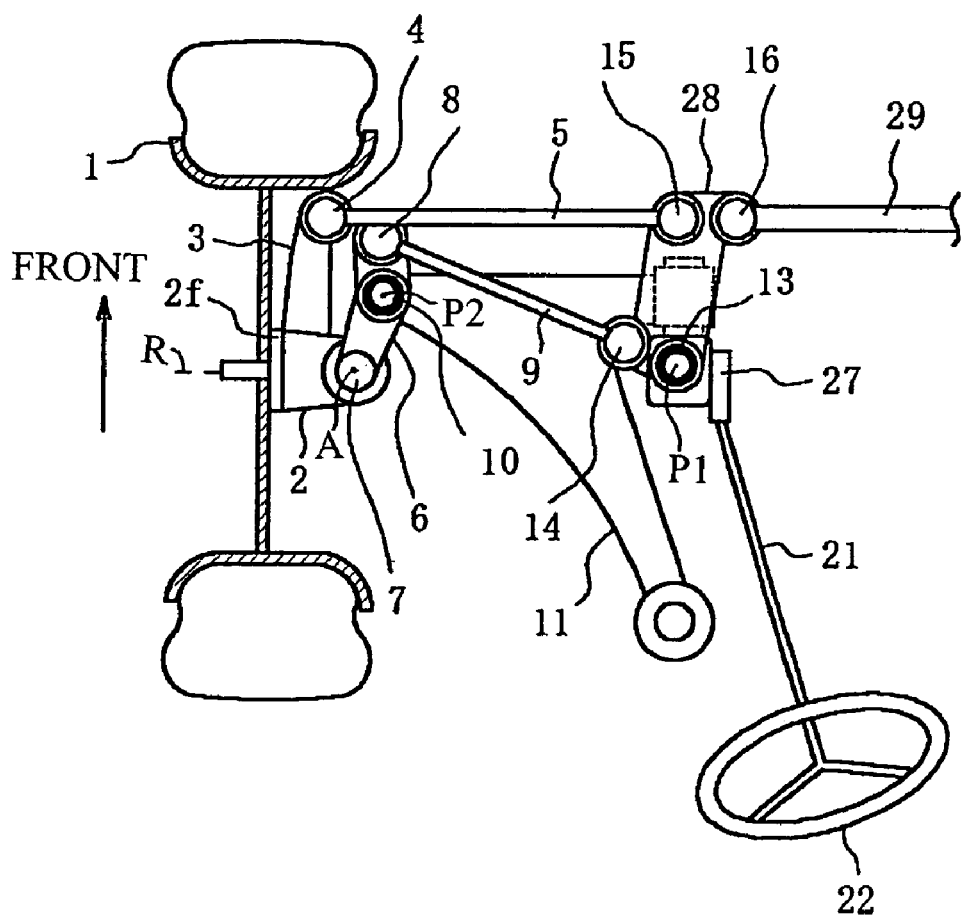
FIG. 7 is a partial diagrammatic top plan view of a vehicle steering system in accordance with a second embodiment of the present invention.

Referring now to FIG. 7, a vehicle steering system is illustrated in accordance with a second embodiment. In view of the similarity between the first and second embodiments, the parts of the second embodiment that are identical or substantially identical to the parts of the first embodiment will be given the same reference numerals as the parts of the first embodiment. Moreover, the descriptions of the parts of the second embodiment that are identical or substantially identical to the parts of the first embodiment may be omitted for the sake of brevity.

FIG. 7 is a partial diagrammatic top plan view of the left side of the vehicle steering system. The right side of the vehicle steering system is a mirror image of the left side, and thus, the right side of the vehicle steering system will not be illustrated. The vehicle steering system is mechanically connected to the steering shaft 21 through a steering gear box 27 and a pitman arm 28 such that a strut type front suspension and a rack-and-pinion type front wheel steering system are used together.

The front end part of the steering shaft 21 is meshed with the gear box 27, and the rear end part of the steering shaft 21 is connected to the steering wheel 22. Also, the gear box 27 is connected to the pitman arm 28. The pitman arm 28 performs the same function as the arm member 12 in the first embodiment. The pitman arm 28 is joined through the ball joint or connecting point 15 to the left side of the steering linkage 29 which extends from the center to the left side in the vehicle's widthwise direction. On the other hand, the right side (not shown) of the steering linkage 29 is connected to the pitman arm 28 of the vehicle steering system for steering the right wheel. The right side is configured to be symmetrical to the left side.

One end of the steering shaft 21 is mechanically connected to the pitman arm 28 through the gear box 27. When the driver turns the steering wheel 22 either to the left or right, the pitman arm 28 turns by the rotary motion of the steering shaft 21. When the pitman arm 28 turns toward up, left, or right as seen in FIG. 7, the wheels 1, which are connected to the pitman arms 28 through the tie rods 5 and the steering knuckles 2, as descried above, turns either to the left or right. Thus, the wheels 1 are pushed outwardly in the vehicle's widthwise direction at the same time through the control rods 9 and the extension links 6. Thus, similar to the first embodiment, the steering axis A is shifted in vehicle's widthwise direction when the driver turns the steering wheel 22 either to the left or right from a center position in which the wheels 1 are straight. In other words, when the driver steers to either left or right side of the vehicle and makes the steering angle larger, it is possible to avoid the contact between wheel 1 and the wheel housing of the vehicle body.

Third Embodiment

Figure 8:
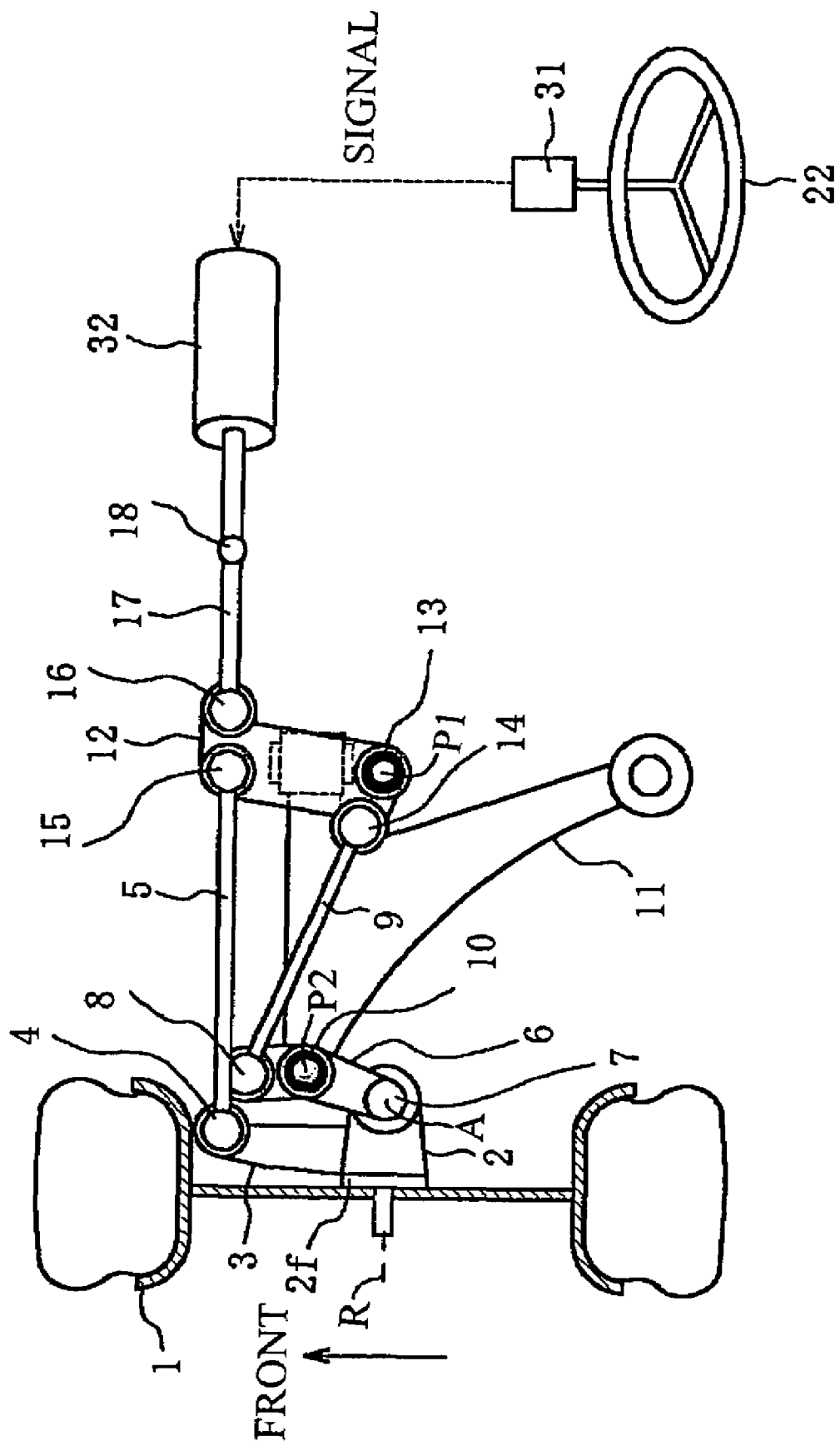
FIG. 8 is a partial diagrammatic top plan view of a vehicle steering system in accordance with a third embodiment of the present invention.
Figure 9:
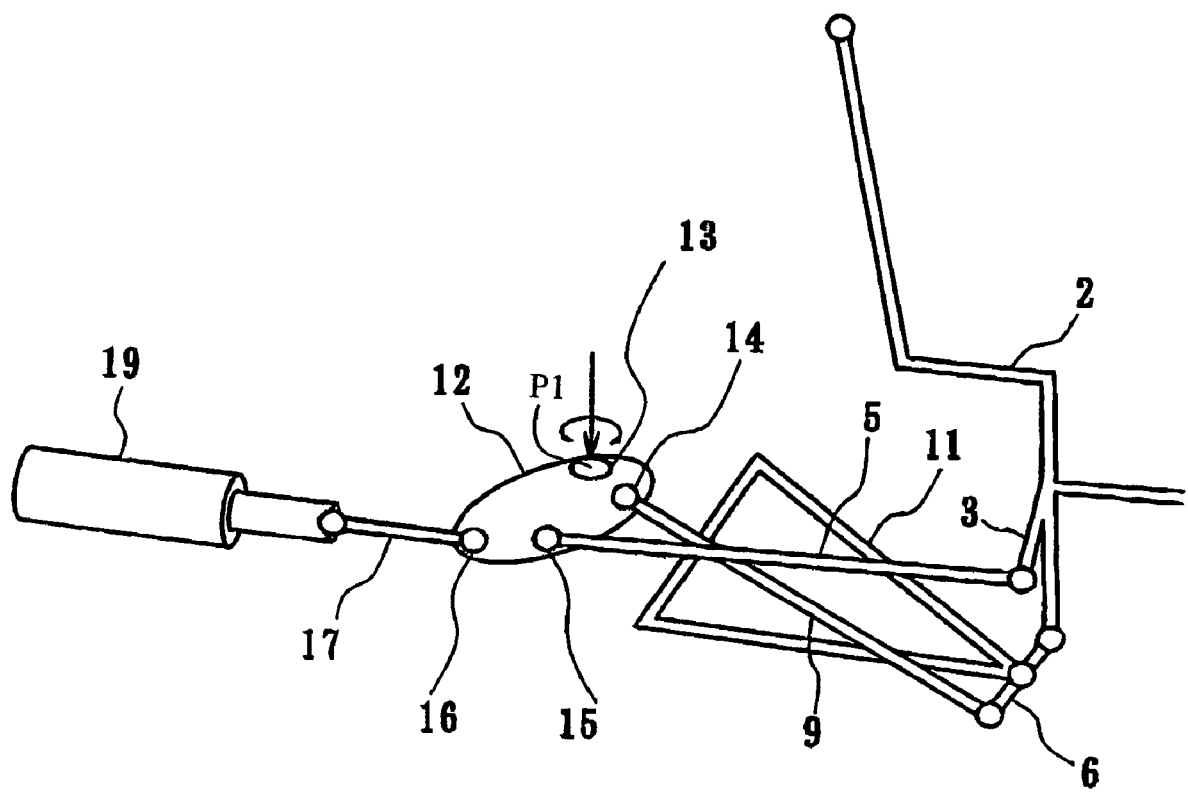
FIG. 9 is a simplified diagrammatic perspective view of a portion of the vehicle steering system in accordance with the third embodiment of the present invention.

Referring now to FIGS. 8 and 9, a vehicle steering system is illustrated in accordance with a third embodiment. In view of the similarity between the first and third embodiments, the parts of the third embodiment that are identical or substantially identical to the parts of the first embodiment will be given the same reference numerals as the parts of the first embodiment. Moreover, the descriptions of the parts of the third embodiment that are identical or substantially identical to the parts of the first embodiment may be omitted for the sake of brevity.

Figure 18:
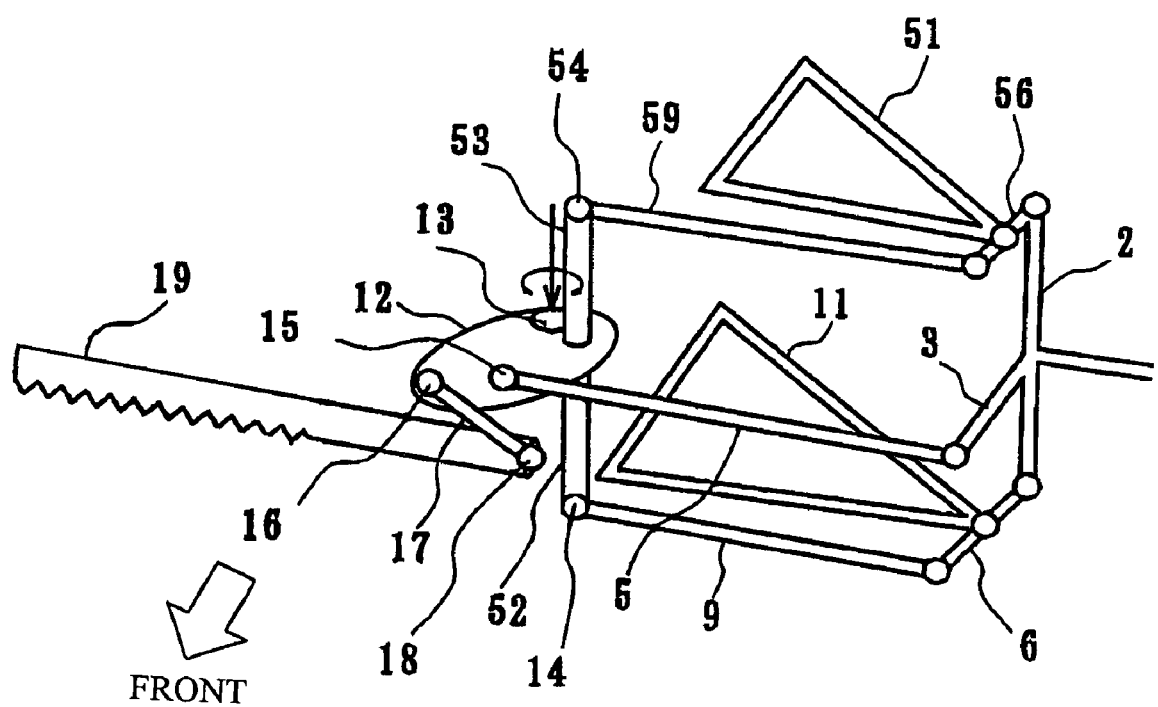
FIG. 18 is a simplified diagrammatic perspective view of a portion of the vehicle steering system in accordance with the present invention.

FIG. 8 is a partial diagrammatic top plan view of the left side of the vehicle steering system. The right side of the vehicle steering system is a mirror image of the left side, and thus, the right side of the vehicle steering system will not be illustrated. FIG. 9 is a diagrammatic perspective view of the left side of the vehicle steering system shown in FIG. 8 combined with the strut type front suspension. Of course, FIG. 9 also illustrates the situation when the vehicle steering systems shown in the prior and subsequent embodiments are combined with the strut type front suspension. Thus, when each embodiment of the present invention is combined with the strut type front suspension, the extension rod 6 that shifts the steering knuckle 2 in the width direction of the vehicle is mounted on the lower link 11 of the strut type front suspension to allow the steering knuckle 2 to move vertically relative to the vehicle body. Also, the vehicle steering system of each embodiment of the present invention can be used with a double wishbone suspension that is shown in FIG. 18 and will be described later.

Instead of using the gear box 27, the pitman arm 28, and the steering linkage 29, as shown in FIG. 7, it is possible to attain same functionality by using a power steering mechanism. In particular, a steering angle sensor 31 detects the angle of the steering wheel 22 and sends information of the steering angle to an actuator 32 that is connected to the ball joint 18 through the link rod 17. The actuator 32 moves the link rod 17 back and forward in the vehicle's widthwise direction. Therefore, the arm member 12 turns either to the left or right. This movement of arm member 12 causes the tie rod 5 and the steering knuckle 2, as mentioned above, to turn the wheel 1 to the left or right, while movement of arm member 12 pushes the wheel 1 in the vehicle's widthwise direction through the control rod 9 and the extension link 6. Thus, similar to the prior embodiment, the steering axis A is shifted in vehicle's widthwise direction when the driver turns the steering wheel 22 either to the left or right from a center position in which the wheels 1 are straight.

Similar to the first and second embodiments mentioned above, on each side of the steering system the steering knuckle 2, the extension link 6, and the arm member 12 are arranged sequentially in a line from the wheel 1 toward the center of the vehicle. The extension link 6 generally extends in the vehicle's lengthwise direction with the steering knuckle 2 being pivotally coupled at the rear end part 6a. The extension link 6 is joined at the front end part 6b to the arm member 12 through the control rod 9 and the ball joints or connecting points 8 and 14. The extension link 6 is generally fixed to the lower link 11 of the suspension arm at the pivot axis P2. The arm member 12 is connected to the front end part 6b of the extension link 6 at a joint point situated further outside than the pivotal attachment point P1, while the arm member 12 is connected to the knuckle arm 3 by the tie rod 5 through the connecting points 4 and 15. Therefore, when the arm member 12 turns to the right, the wheels 1 turn to the right. In other words, the wheels 1 are pushed outside in the vehicle's widthwise direction. On the other hand, when the arm members 12 turn to the left, the wheels 1 turn to the left. In other words, the wheels 1 are pushed outside in the vehicle's widthwise direction. As a result, even though the steering angle is large and a part of the each of wheels 1 shifts inside toward the vehicle's center, it is possible to avoid contact between wheels 1 and the wheel housings (not shown) and to make the radius of turn of the vehicle smaller. In other words, it is possible to downsize designed space for the wheel housings without sacrificing space in an engine room. Therefore, even though a vehicle is not wide, a large engine or transmission can be formed.

Thus, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Fourth Embodiment

Figure 10:
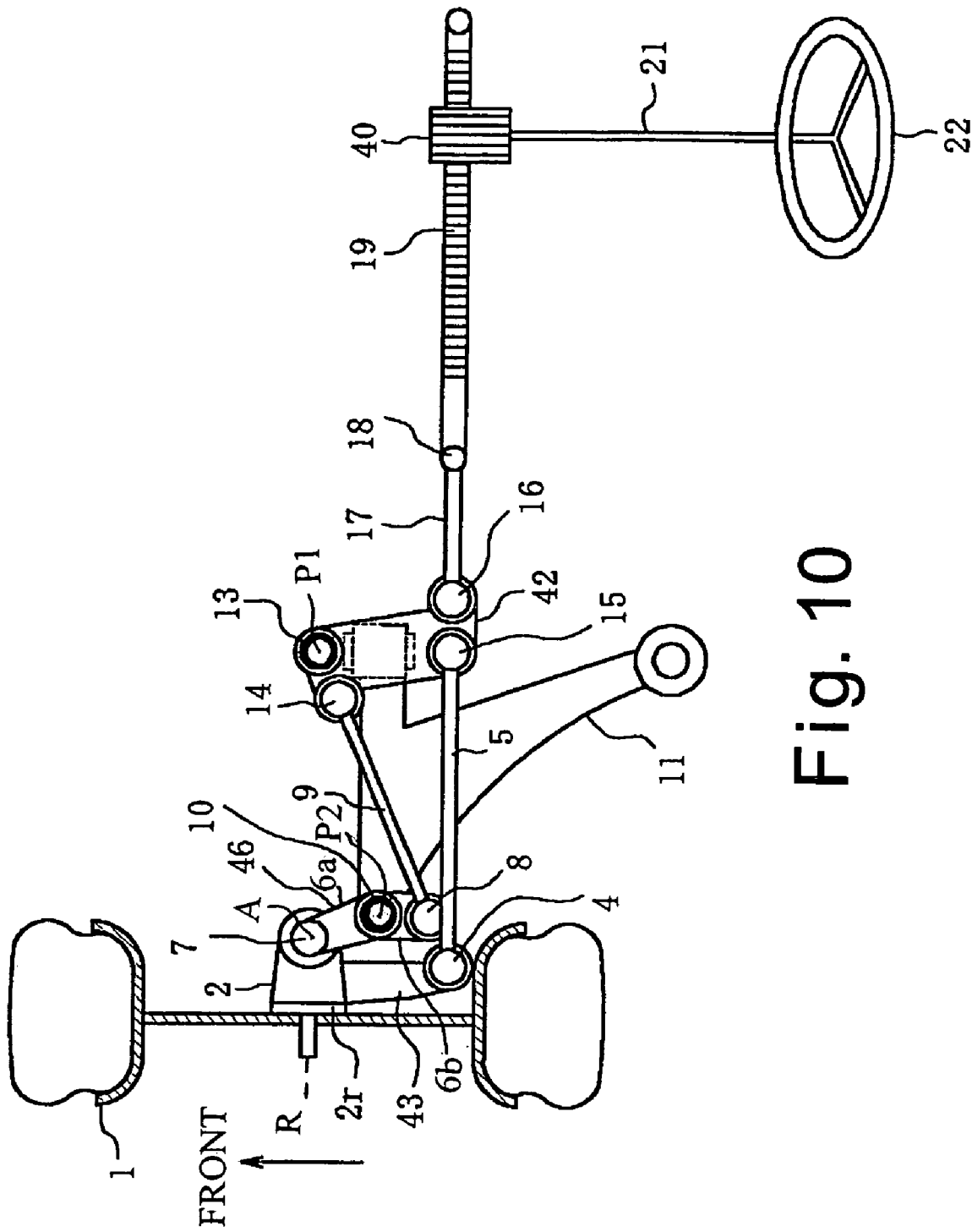
FIG. 10 is a partial diagrammatic top plan view of a of the vehicle steering system in accordance with a fourth embodiment of the present invention.

Referring now to FIG. 10, a vehicle steering system is illustrated in accordance with a fourth embodiment. In view of the similarity between the first and fourth embodiments, the parts of the fourth embodiment that are identical or substantially identical to the parts of the first embodiment will be given the same reference numerals as the parts of the first embodiment.

FIG. 10 is a partial diagrammatic top plan view of the left side of the vehicle steering system with the strut type front suspension and the rack-and-pinion type front wheel steering system in accordance with a different embodiment of the present invention. The right side of the vehicle steering system is a mirror image of the left side, and thus, the right side of the vehicle steering system will not be illustrated.

Fundamental mechanism of the present embodiment is the same as the one in the embodiment shown in FIGS. 1, 3, and 5, but the knuckle arms 43 bulge from the rear end part 2r of the steering knuckle 2 backward. Also, the extension link 46 and the arm member 42 are symmetrically situated in back and forth (flipped situation) on the side of the vehicle's body.

More specifically, the front end part 6a of the extension link 46 is pivotally coupled to the steering knuckle 2, while the rear end part 6b is pivotally coupled to the control rod 9. The arm member 42 is pivotally mounted at the front end part 6a to a vehicle side member (not shown) through the connecting point 13 that has a center pivot axis extending generally in a vertical direction. The connecting point 14 is situated further outside in the vehicle's widthwise direction than the connecting point 13, which is connected to the inside of the control rod 9 in the vehicle's widthwise direction.

Also, two connecting points 15 and 16 are situated on the rear end part of the arm member 42. The connecting point 15 is situated further outside in the vehicle's widthwise direction than the connecting point 16. The connecting point 15 is pivotally coupled to the tie rod 5, and has a center pivot axis extending generally in a vertical direction. On the other hand, the connecting point 16 is situated closer to the center in the vehicle's widthwise direction, and is pivotally coupled to the link rod 17 extending approximately in the vehicle's widthwise direction. The connecting point 16 has a center pivot axis extending generally in a vertical direction.

When driver turns the steering wheel 22 either left or right side of the vehicle, the arm member 42 turns either left or right around the pivotal attachment point P1 as a point of support. Then, similar to the prior embodiments described above, the wheels 1 connected to the arm members 42 through the tie rods 5 and the knuckle arms 43 turn either to the left or right end. At the same time, the wheels 1 are pushed out in the vehicle's widthwise direction through the control rods 9 and the extension links 6. In particular, when the driver steers the steering wheel 22 either to the left or the right side of the vehicle, the pinion 40 that is connected to the steering wheel 22 shifts the steering rack 19 either to the right or the left in the vehicle's width direction. The arm members 42 are connected to the steering rack 19 by the link rods 17 such that the arm members 42 are rotated either clockwise or counter-clockwise direction around the connecting point 13 (i.e., the pivotal attachment point P1). Then, similar to the prior embodiments described above, the wheels 1 are connected to the arm members 42 through the intermediary of the tie rods 5 and the knuckle arms 43 turn either to the left or the right side of the vehicle and at the same time are pushed outwardly through the control rods 9 and the extension links 46.

In this embodiment, when the directions of the knuckle arms 43 are backward, the arm members 42 extend backwardly from the pivotal attachment point P1 as well. However, if the arm members 42 are situated to extend forwardly relative to the connecting point 13, then the wheels 1 turns either to the left or the right side of the vehicle and are pushed outwardly in the vehicle's width direction by configuring the connecting point 14, the connecting point 15, and the attaching point 13 in appropriate places from the center of turning axis P1.

In the present embodiment, same as the previous embodiment described above, when the wheels 1 are turned either the left or the right side of the vehicle, they are shifted or pushed outside in the vehicle's widthwise direction. As a result, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Fifth Embodiment

Figure 11:
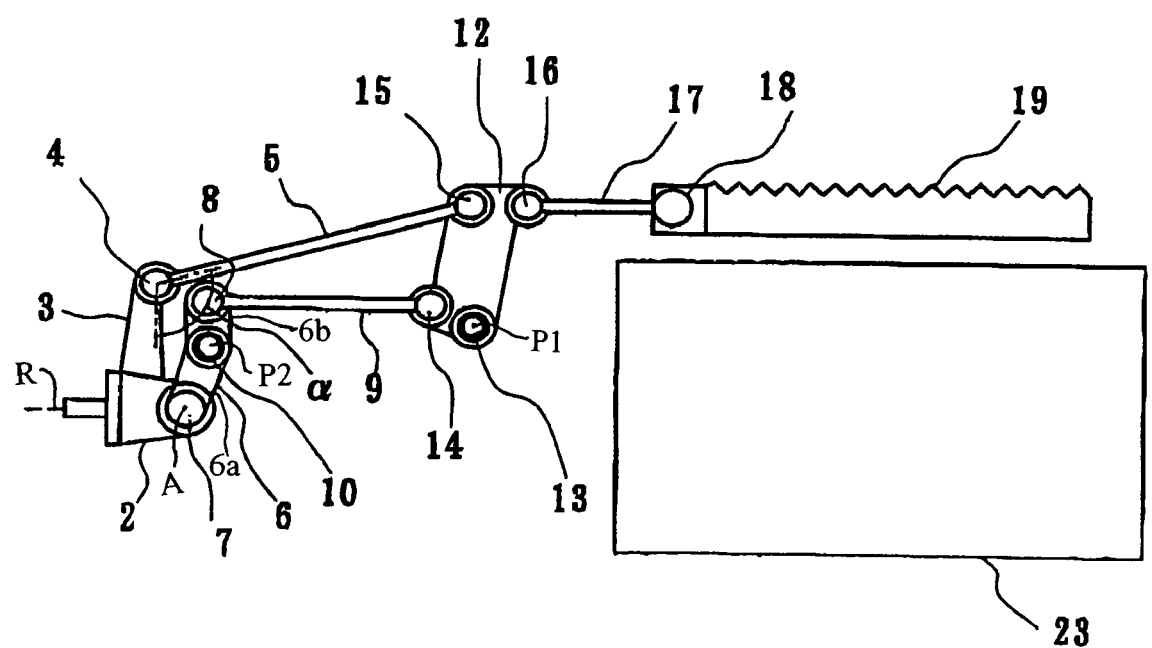
FIG. 11 is a partial diagrammatic top plan view of a vehicle steering system in accordance with a fifth embodiment of the present invention.

Referring now to FIG. 11, a vehicle steering system is illustrated in accordance with a fifth embodiment. In view of the similarity between this fifth embodiment and the prior embodiments, the parts of the fifth embodiment that are identical or substantially identical to the parts of the prior embodiments will be given the same reference numerals as the parts of the prior embodiment. Moreover, the descriptions of the parts of the fifth embodiment that are identical or substantially identical to the parts of the prior embodiment may be omitted for the sake of brevity. Also, the right side of the vehicle steering system is a mirror image of the left side, and thus, the right side of the vehicle steering system will not be illustrated.

The vehicle steering system shown in FIG. 11 is identical to the first embodiment, except that the locations of the arm members 12, the link rods 17, and steering rack 19 are positioned more forward of the kingpin axes A. More specifically, since the engine/transmission structure 23 is configured in the front of the vehicle, the arm members 12, the link rods 17, and steering rack 19 are further forward in the present embodiment than other embodiments described above. Thus, the connecting points 15 are configured further forward than the connecting points 4 at the forefront end of the knuckle arm 3.

If the connecting point 15, that is connecting the arm member 12 and the tie rod 5 together, and the connecting point 16, that is connecting the arm member 12 and the link rod 7 together, are shifted further forward without changing the size of the arm member 12 of the vehicle steering system of the embodiment 1, the crossing angle "α" of the knuckle arm 3 and the tie rod 5 will be greater than 90 degrees when the driver does not steer(vehicle in the straight condition). Since the crossing angle "α" of the vehicle steering system shown in FIG. 11 is greater than 90 degrees, this vehicle steering system does not utilize the Ackermann Principle, which changes the turning ability of the vehicle relative to other embodiments that use the Ackermann Principle.

Thus, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Sixth Embodiment

Figure 12:
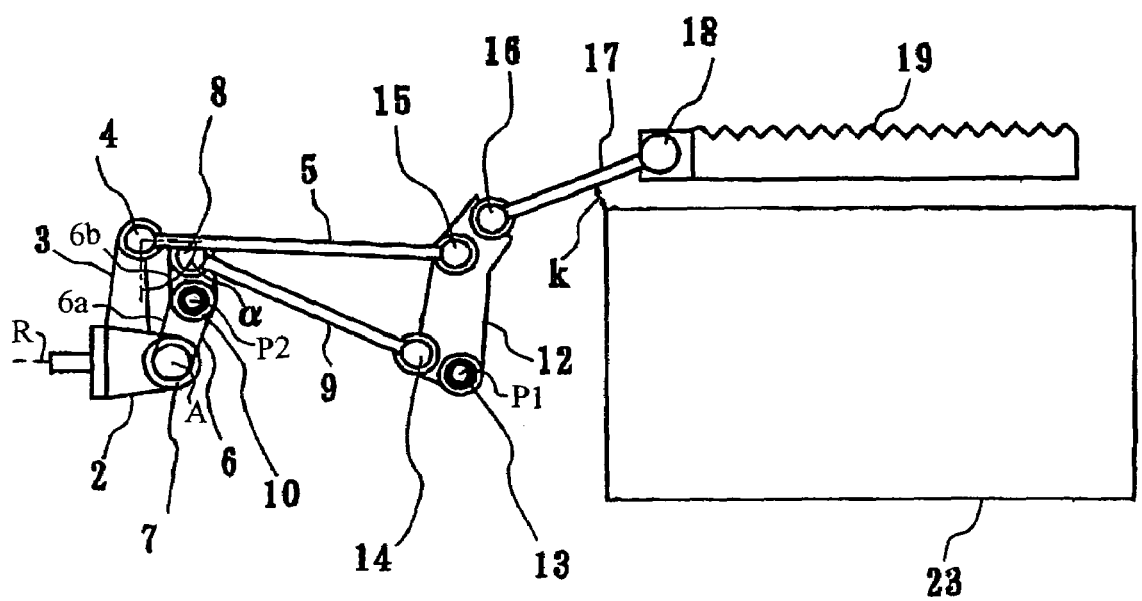
FIG. 12 is a partial diagrammatic top plan view of a vehicle steering system in accordance with a sixth embodiment of the present invention.

Referring now to FIG. 12, a vehicle steering system is illustrated in accordance with a sixth embodiment. In view of the similarity between this sixth embodiment and the prior embodiments, the parts of the sixth embodiment that are identical or substantially identical to the parts of the prior embodiments will be given the same reference numerals as the parts of the prior embodiment. Moreover, the descriptions of the parts of the sixth embodiment that are identical or substantially identical to the parts of the prior embodiment may be omitted for the sake of brevity. Also, the right side of the vehicle steering system is a mirror image of the left side, and thus, the right side of the vehicle steering system will not be illustrated.

The vehicle steering system shown in FIG. 12 is identical to the first embodiment, except that the steering rack 19 in the present embodiment is shifted forward relative to the steering knuckle 2, similar to FIG. 11. More specifically, in this embodiment, front end of the engine/transmission structure 23 is located adjacent the steering rack 19 with the arm member 12 being disposed to the side and rearwardly of the front edge of the engine/transmission structure 23. Moreover, the connection point 4 between knuckle arm 3 and the tie rod 5 is located slightly forward of the connection point 15 between the arm member 12 and the tie rod 5 so that an acute crossing angle "α" is formed between the knuckle arm 3 and the tie rod (i.e., less than 90 degrees) when the driver does not steer (vehicle in the straight condition). However, since in this embodiment compared to the embodiment of FIG. 11, the connecting points 15 and 16 are disposed rearwardly of the steering rack 19 with the connecting point 16 being positioned more forwardly relative to connecting point 15, the link rod 17 is located close to the front edge of the engine/transmission structure 23. In other words, the connecting points 15 and 16 are positioned more rearwardly compared to the front left end of the engine/transmission structure 23 such that a space "k" is formed between the link rod 17 and the front side end of the engine/transmission structure 23. Thus, it is important that the location of the connection point between the link rod 17 and the steering rack 19 be located close to the front side end of the engine/transmission structure 23 so that the space "k" between the link rod 17 and the front side end of the engine/transmission structure 23. Otherwise, the link rod 17 may contact the front side end of the engine/transmission structure 23 during turning, and thus, limit the turning angle of the vehicle.

Since the crossing angle "α" of the vehicle steering system shown in FIG. 12 is less than 90 degrees (acute angle) when the driver does not steer (vehicle in the straight condition), this vehicle steering system utilizes the Ackermann Principle, which improves the turning ability of the vehicle relative to the embodiment shown in FIG. 11. However, as mentioned above, the space "k" between the link rod 17 and the engine/transmission structure 23 should be keep large enough, such that the link rod 17 avoids contact with the engine/transmission structure 23 when the steering rack shifts outwardly of the vehicle's width direction.

In any event, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Seventh Embodiment

Figure 13:
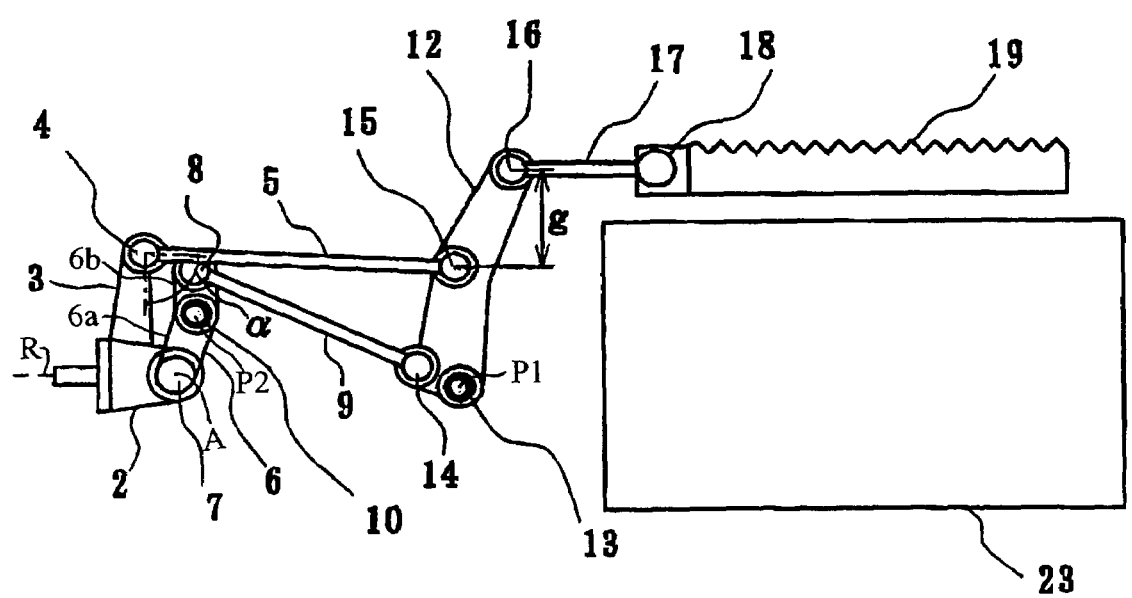
FIG. 13 is a partial diagrammatic top plan view of a vehicle steering system in accordance with a seventh embodiment of the present invention.

Referring now to FIG. 13, a vehicle steering system is illustrated in accordance with a seventh embodiment. In view of the similarity between this seventh embodiment and the prior embodiments, the parts of the seventh embodiment that are identical or substantially identical to the parts of the prior embodiments will be given the same reference numerals as the parts of the prior embodiment. Moreover, the descriptions of the parts of the seventh embodiment that are identical or substantially identical to the parts of the prior embodiment may be omitted for the sake of brevity. Also, the right side of the vehicle steering system is a mirror image of the left side, and thus, the right side of the vehicle steering system will not be illustrated.

The vehicle steering system shown in FIG. 13 is identical to the first embodiment, except that the arm member 12 has been modified such that the steering rack 19 is shifted forward relative to the steering knuckle 2, similar to FIG. 12. More specifically, in this embodiment, front end of the engine/transmission structure 23 is located adjacent the steering rack 19 with the arm member 12 being disposed to the side of the front edge of the engine/transmission structure 23 such that the connecting point 15 is disposed rearwardly of the steering rack 19 and the connecting point 16 positioned to be substantially aligned with the steering rack 19. In particular, the connecting point 16 between the link rod 17 and the arm member 12 is configured to protrude forward by a distance "g" from the connecting point 15 between the tie rod 5 and the arm member 12. Also, the portion of the arm member 12 with the connecting point 16 protrudes forwardly relative to the engine/transmission structure 23. Thus, this arrangement keeps the link rod 17 from contacting the front edge of the engine/transmission structure 23.

Thus, this arrangement of the vehicle steering system shown in FIG. 13, it is possible to make the crossing angle "α" smaller than 90 degrees (i.e., an acute angle). Therefore, it is possible to prevent side slip of the wheel 1 and to actualize smooth turns, due to Ackermann Principle, for front-wheel-drive vehicles and four-wheel-drive vehicles having the engine/transmission structure 23 disposed in the front portion of the vehicle adjacent to the steering rack 19. Moreover, when the steering rack 19 shifts in the vehicle's width direction because the driver steers, it is possible to enlarge the steering angle because the link rod 17 does not touch the engine and the transmission 23.

However, in this embodiment, as the distance "g" between the connecting point 15 and the connecting point 16 becomes larger relative to the overall length between the connecting point 13 and the connecting point 16, then the length of movement of the steering rack 19 needs to be longer to turn the wheels 1 to a desired amount due to leverage. In other words, the distance "g" between the connecting point 15 and the connecting point 16 is limited by the width of the vehicle, which in turn limits the length of movement of the steering rack 19.

In any event, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Eighth Embodiment

Referring now to FIGS. 14-18, a vehicle steering system is illustrated in accordance with an eighth embodiment. In view of the similarity between this eighth embodiment and the prior embodiments, the parts of the eighth embodiment that are identical or substantially identical to the parts of the prior embodiments will be given the same reference numerals as the parts of the prior embodiment. Moreover, the descriptions of the parts of the eighth embodiment that are identical or substantially identical to the parts of the prior embodiment may be omitted for the sake of brevity. Also, the right side of the vehicle steering system is a mirror image of the left side, and thus, the right side of the vehicle steering system will not be illustrated.

The vehicle steering system shown in FIGS. 14-18 is identical to the first embodiment, except that each arm member 12 has been modified such that the steering rack 19 is relocated forward of the arm members 12 with the outer ends of the steering rack 19 extending outwardly relative to the arm members 12, and that a double-wishbone type suspension is used instead of a strut type front suspension as illustrated in FIG. 9. More specifically, in this embodiment, the connecting point 18 between the outer end of the steering rack 19 and the link rod 17 is located further forward than the arm member 12 when the driver does not steer (i.e., the center position in which the vehicle travels in a straight line). In the present embodiment, the steering rack 19 is configured such that both outer ends of the steering rack 19 are located further outside than the arm member 12. Thus, it is possible to configure the arm member 12 in order to make the crossing angle "α" smaller than 90 degrees (i.e., an acute angle) because the link rod 17 does not touch the engine/transmission structure 23 and because the connecting point 15 and 16 are spaced close together. Therefore, in this embodiment, even when the steering rack 19 is configured further forward in the vehicle's length direction than the connecting point 4, it is possible to attain Ackermann Principle to prevent the side slip of the wheel 1 when the driver steers and actualize the smooth turns. Moreover, in this embodiment, the steering rack 19 can be located forward of the connecting point 4 in the vehicle's length direction and adjacent the engine/transmission structure 23 without the problems of either the link rod 17 contacting against the engine/transmission structure 23, or the problem of insufficient vehicle width for the increasing the length of movement in the steering rack 19

Figure 14:
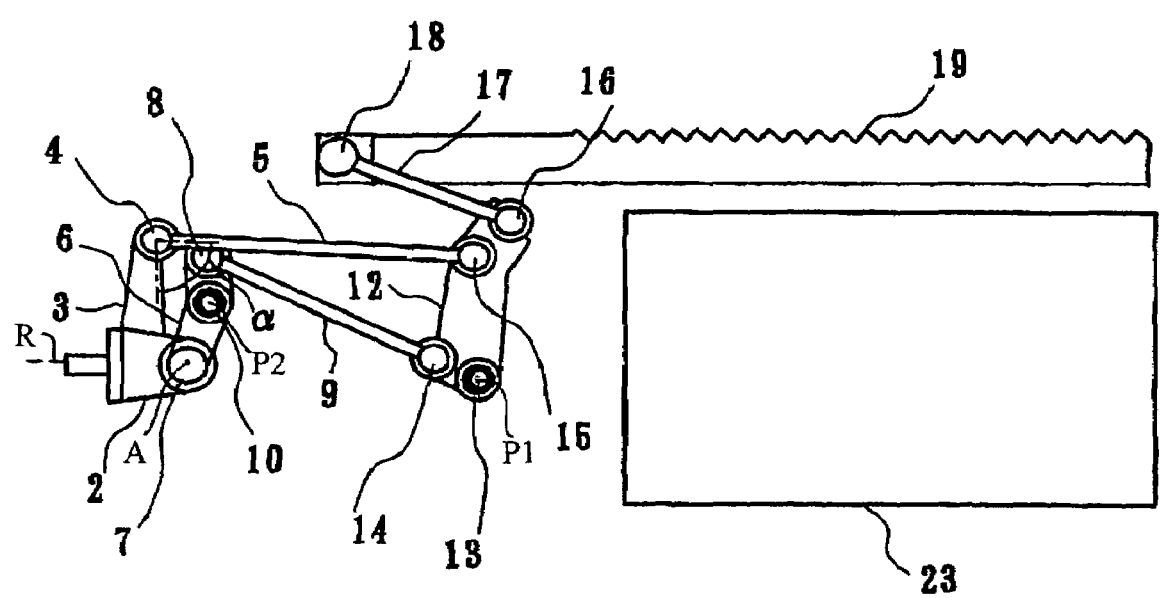
FIG. 14 is a partial diagrammatic top plan view of a vehicle steering system in accordance with an eighth embodiment of the present invention.
Figure 15:
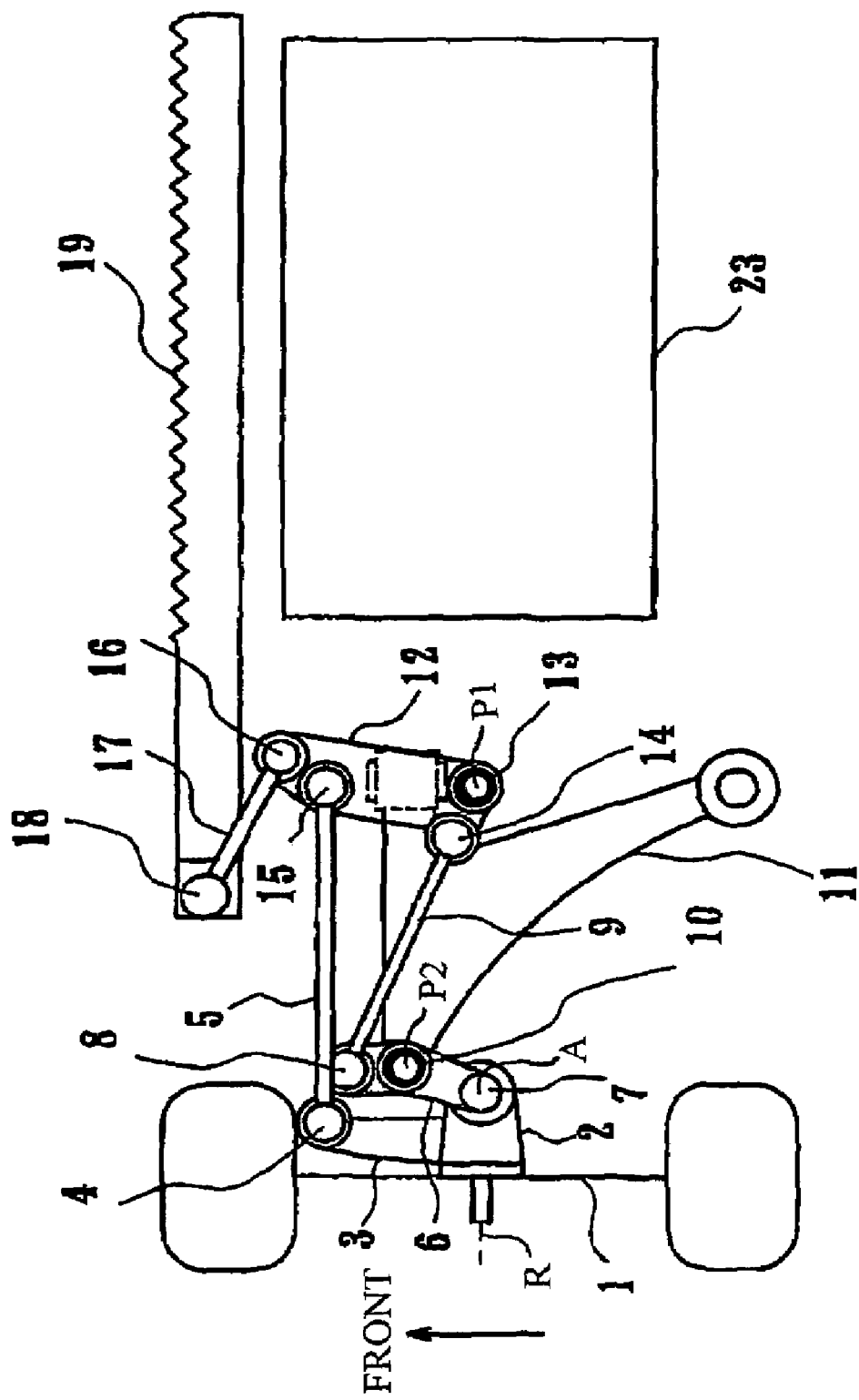
FIG. 15 is a partial diagrammatic top plan view of the vehicle steering system in accordance with the eighth embodiment of the present invention with apportion of the vehicle suspension shown.
Figure 16:
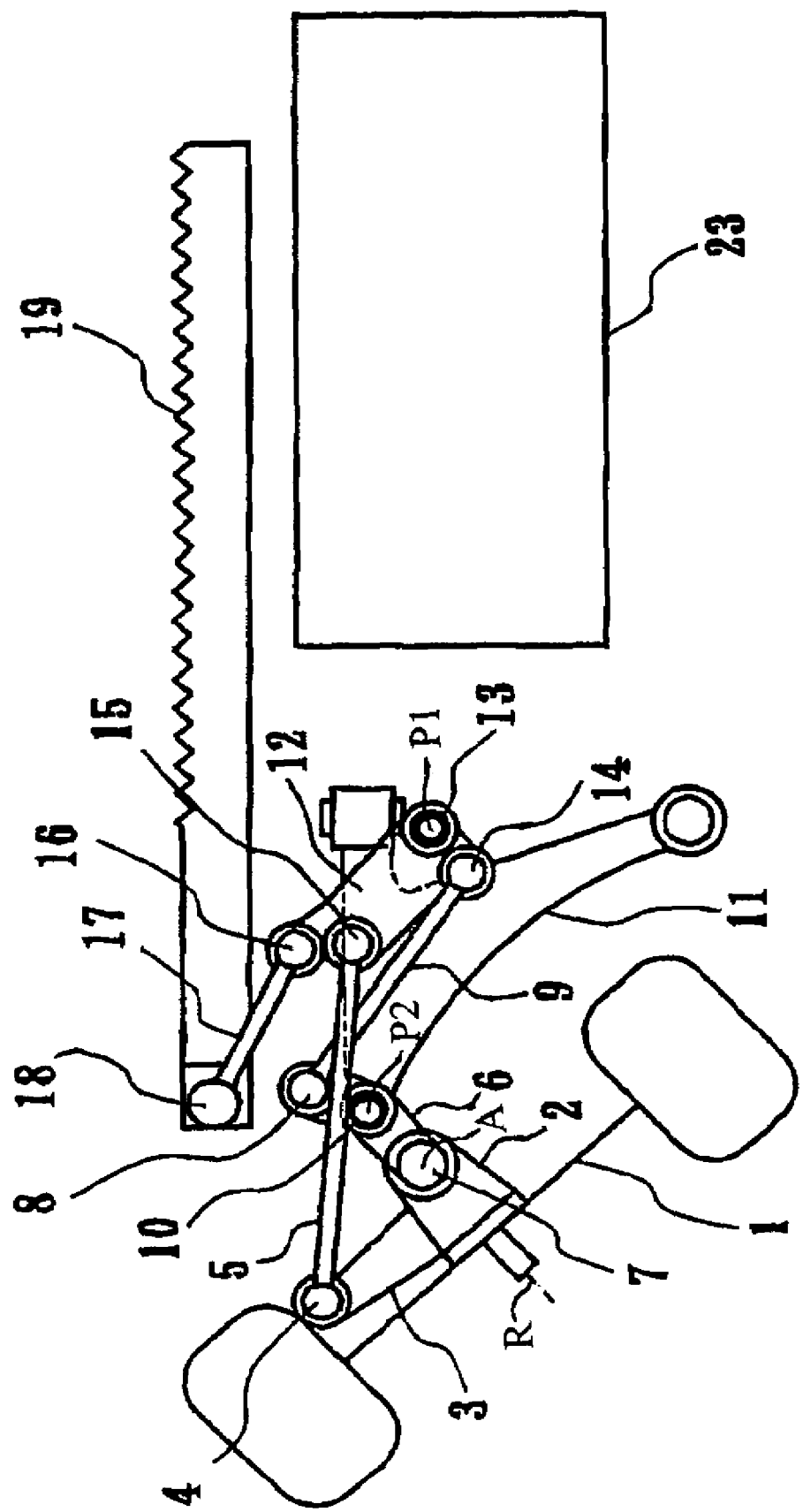
FIG. 16 is a partial diagrammatic top plan view of the vehicle steering system in accordance with the eighth embodiment with the vehicle steering system turned to the left side of the vehicle.
Figure 17:
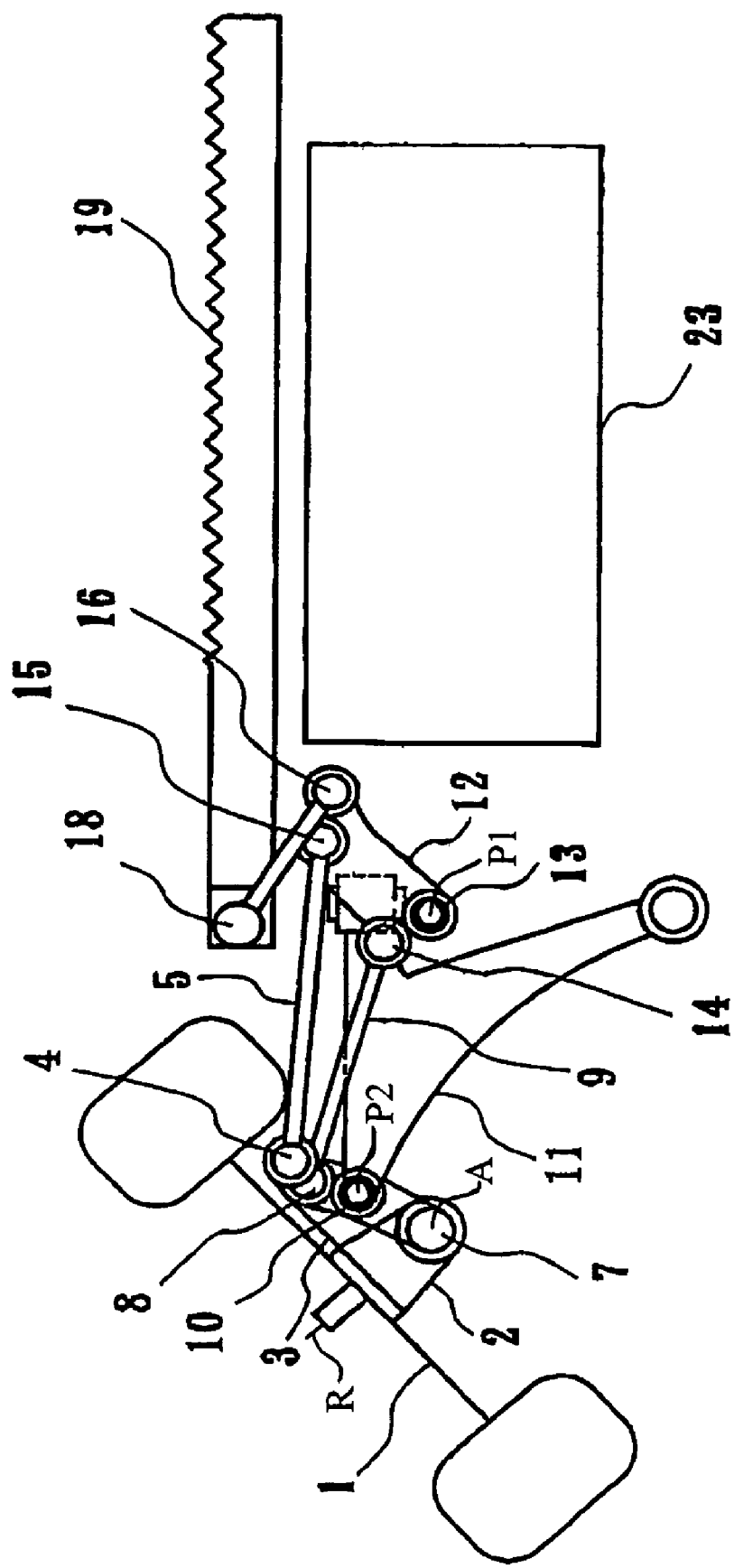
FIG. 17 is a partial diagrammatic top plan view of the vehicle steering system in accordance with the eighth embodiment with the vehicle steering system turned right side of the vehicle.

FIGS. 15-17 shows the vehicle steering system of FIG. 14 mounted to a portion of a strut type front suspension. In particular, the vehicle steering system is illustrated in FIG. 15 in the center position in which the vehicle travels in a straight line, while FIG. 16 shows the vehicle steering system when the driver steers to the left side of the vehicle, and FIG. 17 shows the vehicle steering system when the driver steers right. As shown in FIGS. 15-17, since each member of the vehicle steering system of the present embodiment does not touch the engine/transmission structure 23 and the wheels 1 is pushed outwardly, it is possible to steer large. In other words, it is possible to push the wheels 1 outwardly, and thus, have a large steering angle without each member of the vehicle steering system touching the engine/transmission structure 23, as shown in the FIGS. 15 to 17, because the outer ends of the steering rack 19 are located further outside in the vehicle's width direction than the arm members 12.

Each of the prior embodiments of the steering vehicle system is illustrated with the strut type front suspension, but the vehicle steering system of the present invention is not limited to the embodiments described above. The vehicle steering system of the present invention can be combined with a double-wishbone type suspension or other types of suitable suspensions.

As shown in FIG. 18, the vehicle steering system of FIGS. 14-17 is diagrammatically illustrated as being combined with a double-wishbone type suspension. The vehicle steering system is fundamentally the same mechanism whether used with the strut type front suspension as illustrated in FIG. 9, or with the double-wishbone type suspension as illustrated in FIG. 18. In the double-wishbone type suspension, an upper link 51 is added above the lower link 11. The lower link 11 and the upper link 51 vertically support the wheels for vertically movement is configured above the lower link 11. The lower link 11 and the upper link 51 are pivotally coupled to a potion of the vehicle body or other support member, not shown in the figures. The lower link 11 is pivotally connected at its outer end to the extension link 6. The upper link 51 is pivotally connected at its outer end to the extension link 56. The extension links 6 and 56 are connected at their forward ends to the outside end of the control rods 9 and 59, respectively, and at their rearward ends to the top and lower ends of the steering knuckle 2, respectively.

The connecting point 14 of the arm member 12 includes a pair of arm parts 52 and 53 that extend vertically in opposite directions from of the arm member 12. A bottom end of the arm part 52 that protrudes downwardly is connected to the inner end of the control rod 9 through a ball joint. Likewise, a top end of the arm part 53 protruding upwardly is connected to the side end of the control rod 59 through a ball joint.

In the vehicle steering system illustrated in FIGS. 14-18, and the same as in the ones shown in the prior embodiments, the arm member 12 rotates around the connecting point 13 to move the tie rod 5 and the knuckle arm 3, which turn the steering knuckle 2. Also, the arm member 12 pulls the forward ends of the extension links 6 and 56 via the arm parts 52 and 53, and the control rods 9, and 59, such that the extension links 6 and 56 shift inwardly due to the leverage when their forward ends shifts inwardly, and therefore push the steering knuckle 2 outwardly.

In any event, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Ninth Embodiment

Figure 19:
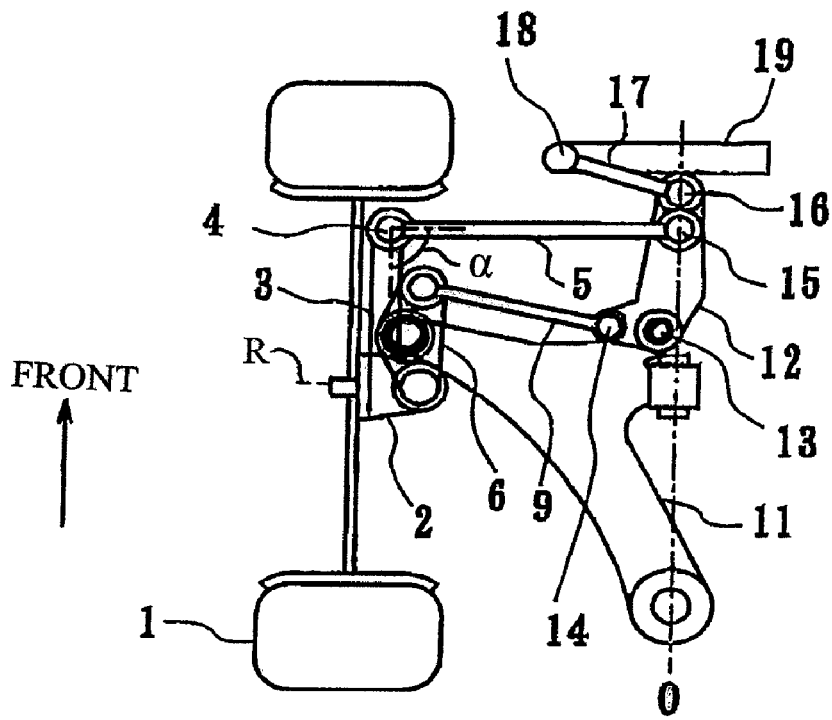
FIG. 19 is a partial diagrammatic top plan view of the vehicle steering system in accordance with a ninth embodiment of the present invention.
Figure 20:
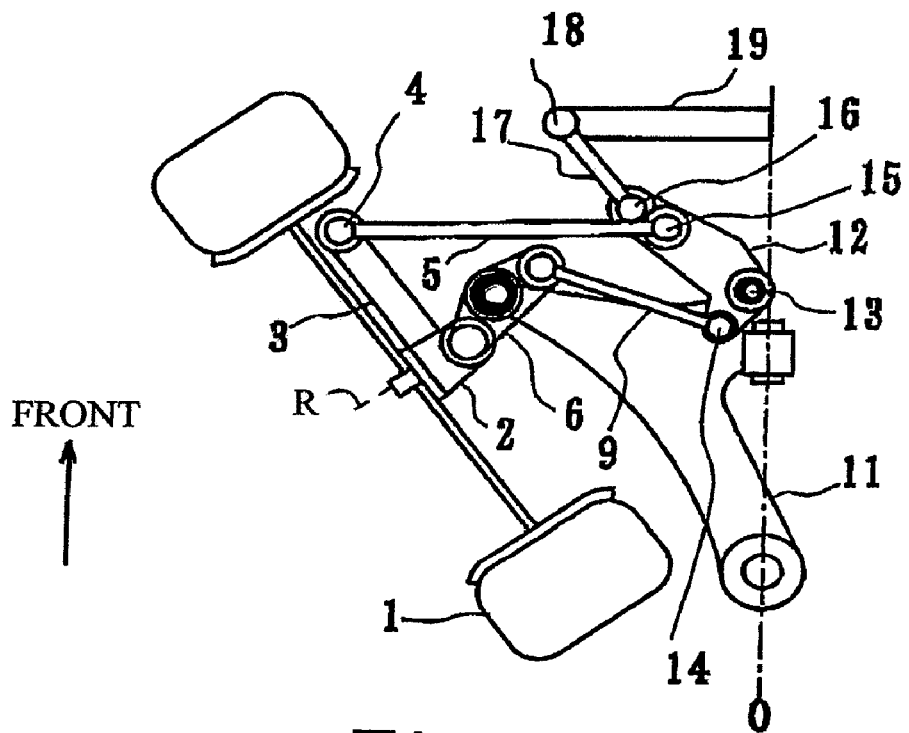
FIG. 20 is a partial diagrammatic top plan view of the vehicle steering system in accordance with the ninth embodiment with the vehicle steering system turned to the left side of the vehicle.
Figure 21:
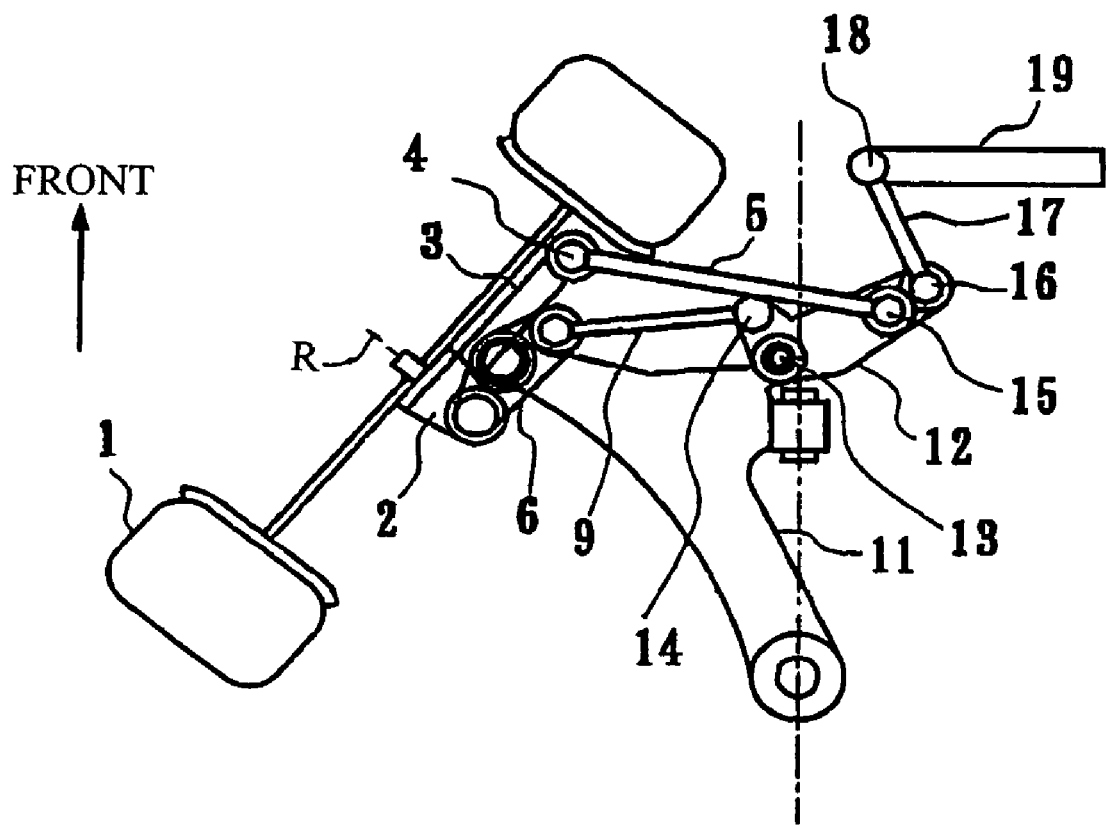
FIG. 21 is a partial diagrammatic top plan view of a vehicle steering system in accordance with the ninth embodiment with the vehicle steering system turned right side of the vehicle.

Referring now to FIGS. 19-21, a vehicle steering system is illustrated in accordance with a ninth embodiment. In view of the similarity between this ninth embodiment and the prior embodiments, the parts of the ninth embodiment that are identical or substantially identical to the parts of the prior embodiments will be given the same reference numerals as the parts of the prior embodiment. Moreover, the descriptions of the parts of the ninth embodiment that are identical or substantially identical to the parts of the prior embodiment may be omitted for the sake of brevity. Also, the right side of the vehicle steering system is a mirror image of the left side, and thus, the right side of the vehicle steering system will not be illustrated.

FIG. 19 shows the vehicle steering system of the present invention when the driver maintains the steering wheel in a center position in which the wheels 1 are straight. FIG. 20 shows the vehicle steering system of the present invention when the driver steers to the left side of the vehicle, and FIG. 21 shows the same when driver steers to the left side of the vehicle. For the present embodiment, when the driver steers, the wheel 1 is pushed outwardly, just as in other embodiments, in the vehicle's width direction in order to turn.

As seen in FIG. 19, the vehicle steering system of this embodiment is identical to the eighth embodiment, except that each arm member 12 has been mounted on one of the lower links 11. More specifically, in this embodiment, the inner end of the lower link 11 is mounted to the vehicle body or support member along a longitudinally extending line "O", such that the lower link 11 pivots about the line "O" as the wheel 1 moves vertically. For this reason, both the connecting points 15 and 16 of the arm member 12 are preferably configured and arranged on the line "O" when the driver does not steer (i.e., the center position in which the vehicle travels in a straight line).

The arm member 12 is preferably configured and arranged around the line "O" such that when the wheel 1 bounces, the lower link 11 moves and therefore the arm member 12 mounted on the lower link 11 moves as well. In this case, there is a problem placing a burden on the driver because the link rod 17 that is connected to the arm member 12 is pulled inwardly or pushed outwardly in the vehicle's width direction and then the steering wheel that is connected to the link rod 17 is affected. Also when the wheel 1 bounces, the driving stability is impaired because the arm member 12 that is attached to the lower link 11 moves vertically and rotates around the attaching point 13, and as a result the tie rod 5 and the control rod 9 are pulled inwardly or pushed outwardly in the vehicle's width direction. It is possible to avoid these problems and assure the ability of the vehicle going straight even on a rough surface road by configuring the arm member 12 around the line "O" and locate the connecting point 16 approximately on the line "O."

In other words, similar to the prior embodiment, the steering axis A is shifted in vehicle's widthwise direction when the driver turns the steering wheel either to the left or right from a center position in which the wheels 1 are straight. In other words, when the driver steers to either left or right side of the vehicle and makes the steering angle larger, it is possible to avoid the contact between wheels 1 and the wheel housings of the vehicle body.

Figure 22:
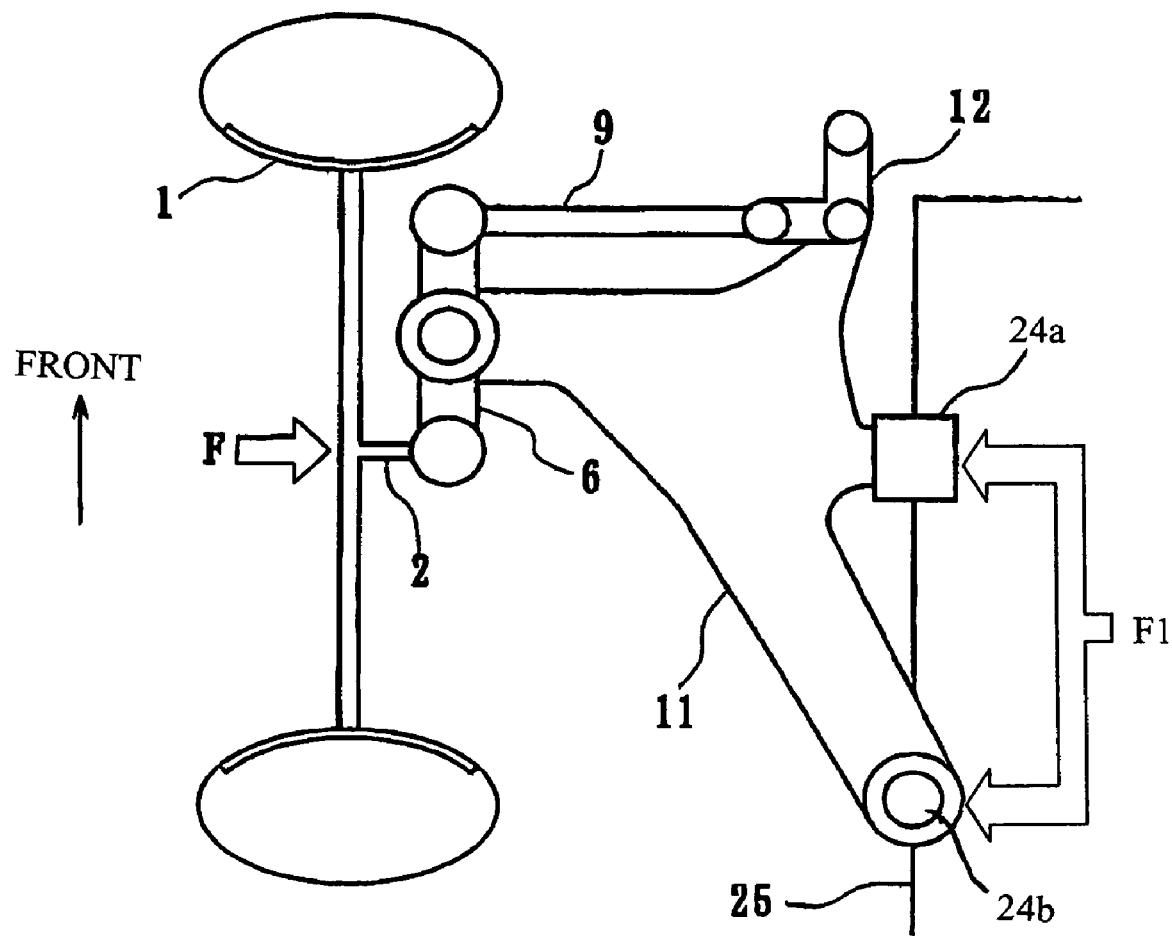
FIG. 22 is a partial diagrammatic top plan view of a vehicle steering system in accordance with the first embodiment of the present invention when pressure applies to each member.
Figure 23:
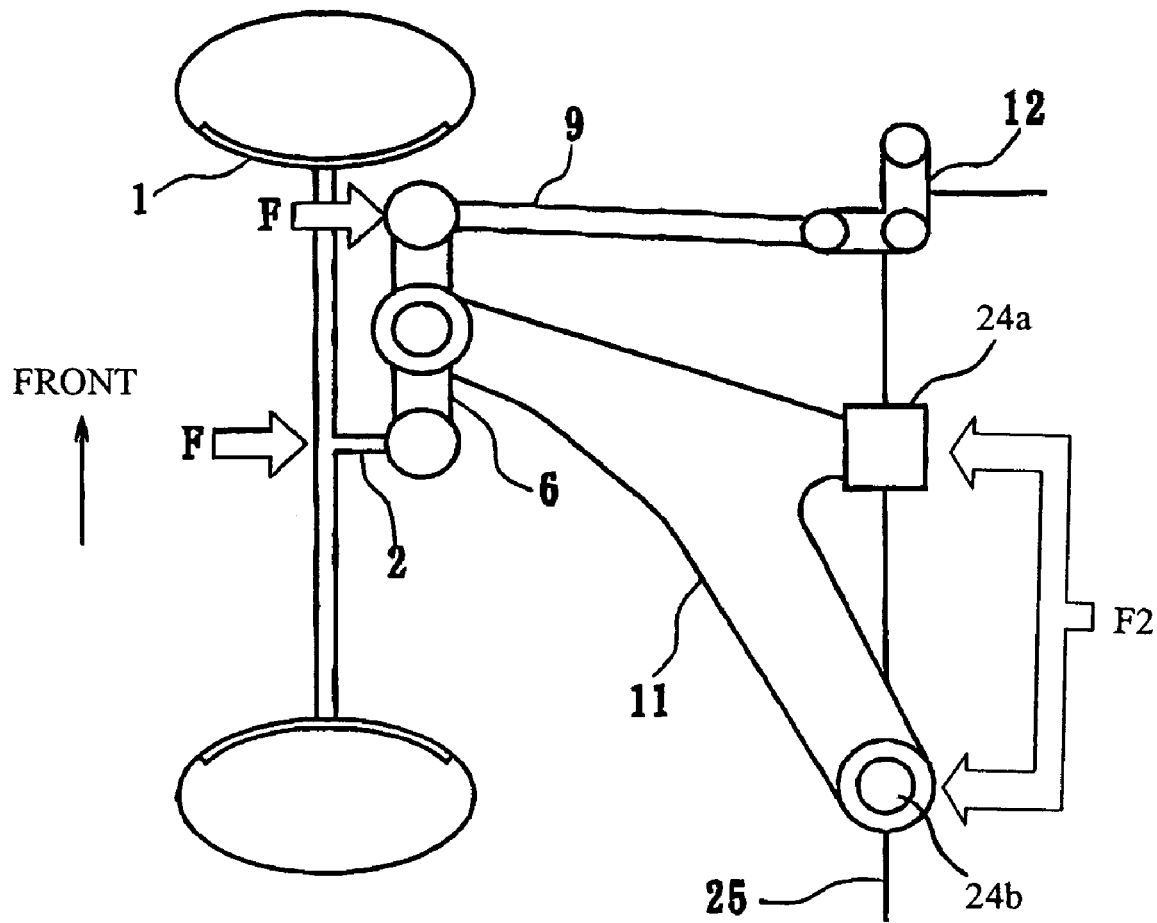
FIG. 23 is a partial diagrammatic top plan view of a vehicle steering system in accordance with the third embodiment of the present invention when pressure applies to each member.

Now referring to FIGS. 22 and 23, the differences between mounting the arm member 12 of the vehicle steering system of the present invention on the lower link 11 (FIG. 22) and mounting the arm member 12 of the vehicle steering system of the present invention on a support member of the vehicle (FIG. 23) will be diagrammatically illustrated. It is possible to have better driving stability in the embodiment of FIGS. 19-21 the present invention where than when the arm member 12 is mounted to the vehicle body or on a vehicle support member as in the embodiments of FIGS. 1-18 of the present invention.

FIG. 22 illustrates a closed reaction-force path in which a force "F" occurs in the vehicle's widthwise direction on the wheels 1 is transmitted to the vehicle body or frame 25 by the lower link 11. In other words, the force "F" on the wheels 1 is transmitted to the extension link 6, the control rod 9, and the arm member 12, which in turn transmits the force "F" to the lower link 11. In the illustrated embodiment, the lower link 11 is connected to the vehicle body or frame by two connecting point 24a and 24b. Therefore, the force "F" that affects the connecting points 24a and 24b between the vehicle body or frame 25 and the lower link 11 is countered by a reaction-force "F1" that is equal to the force "F."

On the other hand, FIG. 23 illustrates an open reaction-force path in which the force "F" on the wheels 1 is transmitted to the vehicle body or frame 25 by the lower link 11 and the arm member 12. Therefore, when the arm member 12 is connected directly to the vehicle body or frame 25, the closed reaction-force path is not present. This results in a reaction-force F2 that affects connecting points 24a and 24b between the vehicle body or frame 25 and the lower link 11. The reaction-force F2 is twice as much as the force "F" due to leverage. As mentioned above, in FIG. 22, it is possible to make the force that affects the connecting points 24a and 24b of that in FIG. 23. Thus it is possible to decrease the deterioration of the driving stability because deformation of an elastic bushing that prevents vibration from the road surface at the connecting points 24a and 24b is half. In other words, as shown in FIG. 22, it is possible to prevent large reaction force to the connecting points 24a and 24b that have the elastic bushings by connecting the arm member 12 directly to the lower link 12 instead of connecting the arm member 12 directly to the vehicle body or frame 25 as shown in FIG. 23. Moreover, the vibration from the road surface is stopped at the connecting points 24a and 24b with the elastic bushing, and therefore ride quality increases because road noise is prevented.

The arm member 12 is configured and arranged along the line "O" on which the end of lower link 11 is located. Therefore, it is possible to avoid problems that the driver loses control or the wheel 1 turns unintentionally due to forces pulling inwardly or pushing outwardly the tie rod 5 or the link rod 17.

As used herein to describe the preceding embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. Also, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-200438 and 2004-163338. The entire disclosure of Japanese Patent Application Nos. 2003-200438 and 2004-163338 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle steering system comprising:
   a vehicle wheel configured to be disposed on a side of a vehicle; and
   a steering assembly rotatably supporting the vehicle wheel about a wheel rotational axis and pivotally supporting the vehicle wheel about a steering axis such that the steering axis moves outwardly in a widthwise direction of the vehicle in response to steering of the vehicle from a state in which the vehicle wheel is straight,
   the steering assembly including a steering knuckle and a link coupled to the steering knuckle, the link having a first connecting point pivotally connected to the steering knuckle about the steering axis and a second connecting point located on an opposite side from the first connecting point with respect to a pivotal attachment point, the pivotal attachment point being configured to be pivotally coupled to the vehicle about a stationary vertical axis during steering of the vehicle.

2. The vehicle steering system according to claim 1, wherein
   the steering assembly further includes
      a tie rod connected to the steering knuckle to turn the vehicle wheel about the steering axis in response to movement of the tic rod,
      an arm member configured to be pivotally coupled to the vehicle support structure about a pivot axis and movably connected to the tie rod such that the tie rod moves in response to pivotal movement of the arm member, and
      a control rod operatively connected between the second connecting point of the link and the arm member to push the steering knuckle outwardly in widthwise direction of the vehicle by pivoting of the link.

3. The vehicle steering system according to claim 2, wherein
   the link has a first length extending between the first connecting point of the link that is connected to the steering knuckle and the pivotal attachment point of the link that is longer than a second length extending between the pivotal attachment point of the link and the second connecting point of the link that is connected to the control rod.

4. The vehicle steering system according to claim 3, wherein
   the steering knuckle is connected to the tie rod by a connection point, and the tie rod has a longitudinal axis that intersects an imaginary line extending perpendicularly to the wheel rotational axis and passing through the connection point between the steering knuckle and the tie rod such that the longitudinal axis and the imaginary line form an acute angle therebetween when the wheel is oriented in a straight forward direction of the vehicle.

5. The vehicle steering system according to claim 2, wherein
   the steering knuckle is connected to the tie rod by a connection point, and the tie rod has a longitudinal axis that intersects an imaginary line extending perpendicularly to the wheel rotational axis and passing through the connection point between the steering knuckle and the tie rod such that the longitudinal axis and the imaginary line form an acute angle therebetween when the wheel is oriented in a straight forward direction of the vehicle.

6. The vehicle steering system according to claim 2, wherein
   the steering assembly further includes a steering rack extending in the widthwise direction of the vehicle, the steering rack having an outer end located further outwardly than the arm member in the widthwise direction of the vehicle, and
   the arm member is connected to the outer end of the steering rack by a connection member such that the arm member pivots in response to movement of the steering rack in the widthwise direction of the vehicle.

7. The vehicle steering system according to claim 2, further comprising
   a suspension member pivotally supporting the steering knuckle and pivotally supporting the arm member such that the steering knuckle is vertically movable together with the suspension member.

8. The vehicle steering system according to claim 7, wherein
   the connecting member and the tie rod are connected to the arm member at locations that substantially lie in a vertical plane passing through a pivot axis of the suspension member.

9. A vehicle steering system comprising:
   a vehicle wheel configured to be disposed on a side of a vehicle; and
   a steering assembly rotatably supporting the vehicle wheel about a wheel rotational axis and pivotally supporting the vehicle wheel about a steering axis such that the steering axis moves in a widthwise direction of the vehicle in response to steering of the vehicle,
   the steering assembly including,
      a steering knuckle,
      a link having a first connecting point pivotally connected to the steering knuckle about the steering axis and a second connecting point located on an opposite side of a pivotal attachment point that is configured to be pivotally coupled to the vehicle,
      a tie rod connected to the steering knuckle to turn the vehicle wheel about the steering axis in response to movement of the tie rod, an arm member configured to be pivotally coupled to the vehicle support structure about a pivot axis and movably connected to the tie rod such that the tie rod moves in response to pivotal movement of the arm member, a control rod operatively connected between the link and the arm member to push the steering knuckle outwardly in widthwise direction of the vehicle by pivoting of the link, and a steering rack extending in the widthwise direction of the vehicle, the steering rack having an outer end located further outwardly than the arm member in the widthwise direction of the vehicle, the steering knuckle being connected to the tie rod by a connection point, and the tie rod having a longitudinal axis that intersects an imaginary line extending perpendicularly to the wheel rotational axis and passing through the connection point between the steering knuckle and the tie rod such that the longitudinal axis and the imaginary line form an acute angle therebetween when the wheel is oriented in a straight forward direction of the vehicle, and the arm member being connected to the outer end of the steering rack by a connection member such that the arm member pivots in response to movement of the steering rack in the widthwise direction of the vehicle.

10. The vehicle steering system according to claim 9, further comprising a suspension member pivotally supporting the steering knuckle and pivotally supporting the arm member such that the steering knuckle is vertically movable together with the suspension member.

11. The vehicle steering system according to claim 10, wherein the connecting member and the tie rod are connected to the arm member at locations that substantially lie in a vertical plane passing through a pivot axis of the suspension member.

12. The vehicle steering system according to claim 9, wherein the link has a first length extending between the first connecting point of the link that is connected to the steering knuckle and the pivotal attachment point of the link that is longer than a second length extending between the pivotal attachment point of the link and the second connecting point of the link that is connected to the control rod.

13. The vehicle steering system according to claim 12, further comprising a suspension member pivotally supporting the link at an outer portion and pivotally supporting the arm member at an inner portion such that the steering knuckle is vertically movable together with the suspension member.

14. The vehicle steering system according to claim 13, wherein the connecting member and the tie rod are connected to the arm member at locations that substantially lie in a vertical plane passing through a pivot axis of the suspension member.

15. A vehicle steering system comprising:

a steering knuckle having a steering axis;

an arm member configured to be pivotally supported to a vehicle about a first pivot point;

a tie rod operatively coupled between the arm member and the steering knuckle to pivot the steering knuckle about the steering axis in response to pivotal movement of the arm member;

a control rod pivotally connected to the arm member to move in response to pivotal movement of the arm member; and a link configured to be pivotally supported to the vehicle about a second pivot point, and the link having a first end pivotally connected to the steering knuckle and a second end pivotally connected to the control rod with the second pivot point being located between the first and second ends such that the steering axis of the steering knuckle moves in a widthwise direction of the vehicle in response to pivotal movement of the arm member.

16. The vehicle steering system according to claim 15, wherein the link has a first length extending from the second pivot point to a first connecting point coupling the steering knuckle and the link together that is longer than a second length extending from the second pivot point to a second connecting point coupling the control rod to the link.

17. The vehicle steering system according to claim 15, wherein the control rod is connected to the arm member at a first pivot axis and connected to the second end of the link at a second pivot axis with the first and second pivot axes of the control rod lying in a plane that includes the first pivot point of the arm member when the steering knuckle is arranged to support a wheel parallel to a longitudinal axis of the vehicle.

18. The vehicle steering system according to claim 16, wherein the control rod is connected to the arm member at a first pivot axis and connected to the second end of the link at a second pivot axis with the first and second pivot axes of the control rod lying in a plane that includes the first pivot point of the arm member when the steering knuckle is arranged to support a wheel parallel to a longitudinal axis of the vehicle.

19. A vehicle steering system comprising:

steering knuckle means for pivotally supporting a wheel of a vehicle about a steering axis; and shifting means for laterally shifting the steering axis of the steering knuckle outward in a widthwise direction of a vehicle in response to steering of the vehicle, the shifting means further including a function for pivotally supporting the steering knuckle means at a first supporting point of a link around the steering axis and for pivotally fixing to the vehicle at a pivotal attachment point of the link about a stationary vertical axis during steering of the vehicle with a second supporting of the link being located on an opposite side from the first connecting point with respect to the pivotal attachment point.

* * * * *